United States Patent [19]
Katz

[11] Patent Number: 6,044,135
[45] Date of Patent: *Mar. 28, 2000

[54] TELEPHONE-INTERFACE LOTTERY SYSTEM

[75] Inventor: Ronald A. Katz, Los Angeles, Calif.

[73] Assignee: Ronald A. Katz Technology Licensing, L.P., Beverly Hills, Calif.

[*] Notice: This patent is subject to a terminal disclaimer.

[21] Appl. No.: 09/133,775

[22] Filed: Aug. 12, 1998

Related U.S. Application Data

[60] Continuation of application No. 08/844,000, Apr. 18, 1997, Pat. No. 5,835,576, which is a division of application No. 08/305,822, Sep. 13, 1994, which is a division of application No. 07/756,956, Sep. 9, 1991, Pat. No. 5,365,575, which is a continuation-in-part of application No. 07/555,111, Jul. 18, 1990, Pat. No. 5,048,075, which is a continuation of application No. 07/342,506, Apr. 24, 1989, abandoned, which is a continuation of application No. 07/194,258, May 16, 1988, Pat. No. 4,845,739, which is a continuation-in-part of application No. 07/018,244, Feb. 24, 1987, Pat. No. 4,792,968, which is a continuation-in-part of application No. 06/753,299, Jul. 10, 1985, abandoned.

[51] Int. Cl.[7] .................................................. H04M 11/00
[52] U.S. Cl. ........................................ 379/93.13; 283/903
[58] Field of Search .............................. 379/93.13, 93.26, 379/93.12, 91.01, 91.02, 93.02, 93.03; 283/903, 79, 74, 100, 102; 273/138.1, 139

[56] References Cited

U.S. PATENT DOCUMENTS

| | | |
|---|---|---|
| 2,902,541 | 9/1959 | Singleton . |
| 2,941,161 | 6/1960 | Scantlin . |

(List continued on next page.)

FOREIGN PATENT DOCUMENTS

| | | |
|---|---|---|
| 66113/81 | 7/1981 | Australia . |
| 1022674 | 12/1977 | Canada . |
| 1025118 | 1/1978 | Canada . |
| 1056500 | 6/1979 | Canada . |
| 1059621 | 7/1979 | Canada . |
| 1162336 | 2/1984 | Canada . |
| 1225759 | 8/1987 | Canada . |
| 2009937-2 | 8/1990 | Canada . |

(List continued on next page.)

OTHER PUBLICATIONS

Basinger, R. G., et al., "Calling Card Service—Overall Description and Operational Characteristics", The Bell System Technical Journal, Sep., 1982.

Confalone, D. E., et al, "Calling Card Service—TSPS Hardware, Software, and Signaling Implementation", The Bell System Technical Journal, Sep., 1982.

(List continued on next page.)

*Primary Examiner*—Stella Woo
*Attorney, Agent, or Firm*—Lyon & Lyon LLP

[57] ABSTRACT

A telephonic-interface lottery system D interfaces with a multiplicity of individual terminals T1–Tn of a telephone network facility C to enable lottery players to call and play for at least one additional chance to possibly win by dialing a pay-to-dial telephone number indicated on a "scratch-off" or online game lottery ticket for use in the system. At the terminals, callers are prompted by voice-generated instructions to provide digital data, such as their telephone number, age, social security number, and/or drivers license number. In addition, the sequence number of the caller as well as the date and time of the call is recorded for positive association with a caller and is stored for processing. The caller's identification data is confirmed using various techniques and callers may be ranked and accounted for on the basis of entitlement-and sequence. In accordance with one format, an instant winner is selected online by utilizing techniques such as determining a random winning sequence number or a winning lottery number generated by a number generator. As an adjunct or alternative, the identification data is processed at a later time to determine a grand prize drawing winner by using various processing techniques for determining winners.

24 Claims, 6 Drawing Sheets

U.S. PATENT DOCUMENTS

| | | |
|---|---|---|
| 3,060,275 | 10/1962 | Meacham et al. . |
| 3,076,059 | 1/1963 | Meacham et al. . |
| 3,082,402 | 3/1963 | Scantlin . |
| 3,128,349 | 4/1964 | Boesch et al. . |
| 3,159,818 | 12/1964 | Scantlin . |
| 3,246,082 | 4/1966 | Levy . |
| 3,249,919 | 5/1966 | Scantlin . |
| 3,299,210 | 1/1967 | Bandy . |
| 3,337,847 | 8/1967 | Olsson et al. . |
| 3,347,988 | 10/1967 | Marill et al. . |
| 3,371,162 | 2/1968 | Scantlin . |
| 3,381,276 | 4/1968 | James . |
| 3,393,272 | 7/1968 | Hanson . |
| 3,394,246 | 7/1968 | Goldman . |
| 3,482,057 | 12/1969 | Abbott et al. . |
| 3,515,814 | 6/1970 | Morgan . |
| 3,544,769 | 12/1970 | Hedin . |
| 3,556,530 | 1/1971 | Barr . |
| 3,557,311 | 1/1971 | Goldstein . |
| 3,568,157 | 3/1971 | Downing et al. . |
| 3,569,939 | 3/1971 | Doblmaier et al. . |
| 3,571,799 | 3/1971 | Coker, Jr. et al. . |
| 3,573,747 | 4/1971 | Adams et al. . |
| 3,581,072 | 5/1971 | Nymeyer . |
| 3,594,004 | 7/1971 | Barr et al. ............................... 273/139 |
| 3,617,638 | 11/1971 | Jochimsen et al. . |
| 3,618,038 | 11/1971 | Stein . |
| 3,624,292 | 11/1971 | Guzak, Jr. . |
| 3,644,675 | 2/1972 | Waltington . |
| 3,647,973 | 3/1972 | James et al. . |
| 3,651,480 | 3/1972 | Downing et al. . |
| 3,656,113 | 4/1972 | Lince . |
| 3,665,107 | 5/1972 | Kopec et al. . |
| 3,675,513 | 7/1972 | Flanagan et al. . |
| 3,688,126 | 8/1972 | Klein . |
| 3,696,335 | 10/1972 | Lemelson . |
| 3,697,702 | 10/1972 | Buonsante et al. . |
| 3,781,810 | 12/1973 | Downing . |
| 3,792,446 | 2/1974 | McFiggins et al. . |
| 3,794,774 | 2/1974 | Kemmerly et al. . |
| 3,800,283 | 3/1974 | Gropper . |
| 3,858,032 | 12/1974 | Scantlin . |
| 3,870,821 | 3/1975 | Steury . |
| 3,881,160 | 4/1975 | Ross . |
| 3,889,050 | 6/1975 | Thompson . |
| 3,909,553 | 9/1975 | Marshall . |
| 3,912,874 | 10/1975 | Botterell et al. . |
| 3,914,747 | 10/1975 | Barnes et al. . |
| 3,918,174 | 11/1975 | Miller et al. . |
| 3,920,908 | 11/1975 | Kraus . |
| 3,928,724 | 12/1975 | Byram et al. . |
| 3,934,095 | 1/1976 | Matthews et al. . |
| 3,947,972 | 4/1976 | Freeman . |
| 3,950,618 | 4/1976 | Bloisi . |
| 3,974,338 | 8/1976 | Luzier et al. . |
| 3,982,103 | 9/1976 | Goldman . |
| 3,989,899 | 11/1976 | Norwich . |
| 3,991,406 | 11/1976 | Downing et al. . |
| 3,998,465 | 12/1976 | Mascola . |
| 4,009,342 | 2/1977 | Fahrenschon et al. . |
| 4,012,599 | 3/1977 | Meyer . |
| 4,017,835 | 4/1977 | Randolph . |
| 4,024,345 | 5/1977 | Kochem . |
| 4,054,756 | 10/1977 | Comella et al. . |
| 4,071,698 | 1/1978 | Barger, Jr. et al. . |
| 4,078,316 | 3/1978 | Freeman . |
| 4,088,838 | 5/1978 | Nakata et al. . |
| 4,090,038 | 5/1978 | Biggs . |
| 4,108,361 | 8/1978 | Krause . |
| 4,117,278 | 9/1978 | Ehrlich et al. . |
| 4,121,052 | 10/1978 | Richard . |
| 4,145,578 | 3/1979 | Orriss . |
| 4,150,255 | 4/1979 | Theis et al. . |
| 4,152,547 | 5/1979 | Theis . |
| 4,160,125 | 7/1979 | Bower et al. . |
| 4,162,377 | 7/1979 | Mearns . |
| 4,187,498 | 2/1980 | Creekmore . |
| 4,191,376 | 3/1980 | Goldman . |
| 4,191,860 | 3/1980 | Weber . |
| 4,194,089 | 3/1980 | Hashimoto . |
| 4,200,770 | 4/1980 | Hellman et al. . |
| 4,201,887 | 5/1980 | Burns . |
| 4,223,183 | 9/1980 | Peters, Jr. . |
| 4,232,199 | 11/1980 | Boatwright et al. . |
| 4,241,942 | 12/1980 | Bachman . |
| 4,242,539 | 12/1980 | Hashimoto . |
| 4,243,844 | 1/1981 | Waldman . |
| 4,255,618 | 3/1981 | Danner et al. . |
| 4,260,854 | 4/1981 | Kolodny et al. . |
| 4,264,924 | 4/1981 | Freeman . |
| 4,264,925 | 4/1981 | Freeman et al. . |
| 4,270,024 | 5/1981 | Theis et al. . |
| 4,277,649 | 7/1981 | Sheinbein . |
| 4,290,141 | 9/1981 | Anderson et al. . |
| 4,299,637 | 11/1981 | Oberdeck et al. . |
| 4,302,810 | 11/1981 | Bouricius et al. . |
| 4,303,804 | 12/1981 | Johnson et al. . |
| 4,307,266 | 12/1981 | Messina . |
| 4,314,103 | 2/1982 | Wilson . |
| 4,317,961 | 3/1982 | Johnson . |
| 4,320,256 | 3/1982 | Freeman . |
| 4,323,770 | 4/1982 | Dieulot et al. . |
| 4,328,396 | 5/1982 | Theis . |
| 4,338,494 | 7/1982 | Theis . |
| 4,339,798 | 7/1982 | Hedges et al. . |
| 4,345,315 | 8/1982 | Cadotte et al. . |
| 4,348,554 | 9/1982 | Asmuth . |
| 4,355,207 | 10/1982 | Curtin . |
| 4,355,372 | 10/1982 | Johnson et al. . |
| 4,360,827 | 11/1982 | Braun . |
| 4,371,752 | 2/1983 | Matthews et al. . |
| 4,376,875 | 3/1983 | Beirne . |
| 4,389,546 | 6/1983 | Glisson et al. . |
| 4,393,277 | 7/1983 | Besen et al. . |
| 4,398,708 | 8/1983 | Goldman et al. . |
| 4,405,829 | 9/1983 | Rivest et al. . |
| 4,420,656 | 12/1983 | Freeman . |
| 4,427,848 | 1/1984 | Tsakanikas . |
| 4,439,635 | 3/1984 | Theis et al. . |
| 4,439,636 | 3/1984 | Newkirk et al. . |
| 4,451,087 | 5/1984 | Comstock . |
| 4,451,700 | 5/1984 | Kempner et al. . |
| 4,468,528 | 8/1984 | Reece et al. . |
| 4,475,189 | 10/1984 | Herr et al. . |
| 4,489,438 | 12/1984 | Hughes . |
| 4,490,583 | 12/1984 | Bednarz et al. . |
| 4,494,197 | 1/1985 | Troy et al. . |
| 4,511,764 | 4/1985 | Nakayama et al. . |
| 4,517,410 | 5/1985 | Williams et al. . |
| 4,518,827 | 5/1985 | Sagara . |
| 4,521,643 | 6/1985 | Dupuis et al. . |
| 4,523,055 | 6/1985 | Hohl et al. . |
| 4,532,378 | 7/1985 | Nakayama et al. . |
| 4,539,435 | 9/1985 | Eckmann . |
| 4,539,436 | 9/1985 | Theis . |
| 4,544,804 | 10/1985 | Herr et al. . |
| 4,547,851 | 10/1985 | Kurland . |
| 4,549,047 | 10/1985 | Brian et al. . |
| 4,555,594 | 11/1985 | Friedes et al. . |
| 4,559,415 | 12/1985 | Bernard et al. . |
| 4,559,416 | 12/1985 | Theis et al. . |
| 4,562,342 | 12/1985 | Solo . |

| | | | | | | |
|---|---|---|---|---|---|---|
| 4,566,030 | 1/1986 | Nickerson et al. . | | 4,796,293 | 1/1989 | Blinken et al. . |
| 4,567,359 | 1/1986 | Lockwood . | | 4,797,910 | 1/1989 | Daudelin . |
| 4,570,930 | 2/1986 | Matheson . | | 4,797,911 | 1/1989 | Szlam et al. . |
| 4,577,062 | 3/1986 | Hilleary et al. . | | 4,797,913 | 1/1989 | Kaplan et al. . |
| 4,577,067 | 3/1986 | Levy et al. . | | 4,799,156 | 1/1989 | Shavit et al. . |
| 4,578,700 | 3/1986 | Roberts et al. . | | 4,800,583 | 1/1989 | Theis . |
| 4,580,012 | 4/1986 | Matthews et al. . | | 4,805,209 | 2/1989 | Baker, Jr. et al. . |
| 4,582,956 | 4/1986 | Doughty . | | 4,812,843 | 3/1989 | Champion III, et al. . |
| 4,584,602 | 4/1986 | Nakagawa . | | 4,815,031 | 3/1989 | Furukawa . |
| 4,585,906 | 4/1986 | Matthews et al. . | | 4,815,121 | 3/1989 | Yoshida . |
| 4,586,707 | 5/1986 | McNeight et al. . | | 4,815,741 | 3/1989 | Small . |
| 4,587,379 | 5/1986 | Masuda . | | 4,827,500 | 5/1989 | Binkerd et al. . |
| 4,591,190 | 5/1986 | Clark . | | 4,832,341 | 5/1989 | Muller et al. ........................... 273/139 |
| 4,591,664 | 5/1986 | Freeman . | | 4,842,278 | 6/1989 | Markowicz . |
| 4,592,546 | 6/1986 | Fascenda et al. . | | 4,845,739 | 7/1989 | Katz . |
| 4,594,476 | 6/1986 | Freeman . | | 4,847,890 | 7/1989 | Solomon et al. . |
| 4,598,367 | 7/1986 | DeFrancesco et al. . | | 4,852,154 | 7/1989 | Lewis et al. . |
| 4,603,232 | 7/1986 | Kurland et al. . | | 4,853,882 | 8/1989 | Marshall . |
| 4,611,094 | 9/1986 | Asmuth et al. . | | 4,856,050 | 8/1989 | Theis et al. . |
| 4,614,367 | 9/1986 | Breen . | | 4,866,756 | 9/1989 | Crane et al. . |
| 4,625,079 | 11/1986 | Castro et al. . | | 4,876,592 | 10/1989 | Von Kohorn . |
| 4,625,276 | 11/1986 | Benton et al. . | | 4,876,717 | 10/1989 | Barron et al. . |
| 4,630,200 | 12/1986 | Ohmae et al. . | | 4,882,473 | 11/1989 | Bergeron et al. . |
| 4,630,201 | 12/1986 | White . | | 4,893,328 | 1/1990 | Peacock . |
| 4,634,809 | 1/1987 | Paulsson et al. . | | 4,893,330 | 1/1990 | Franco . |
| 4,635,251 | 1/1987 | Stanley et al. . | | 4,894,857 | 1/1990 | Szlam et al. . |
| 4,645,873 | 2/1987 | Chomet . | | 4,896,345 | 1/1990 | Thorne . |
| 4,649,563 | 3/1987 | Riskin . | | 4,897,867 | 1/1990 | Foster et al. . |
| 4,652,998 | 3/1987 | Koza . | | 4,899,375 | 2/1990 | Bauer et al. . |
| 4,654,482 | 3/1987 | DeAngelis . | | 4,907,079 | 3/1990 | Turner et al. . |
| 4,658,417 | 4/1987 | Hashimoto et al. . | | 4,908,761 | 3/1990 | Tai . |
| 4,663,777 | 5/1987 | Szeto . | | 4,908,850 | 3/1990 | Masson et al. . |
| 4,665,502 | 5/1987 | Kreisner . | | 4,922,520 | 5/1990 | Bernard et al. . |
| 4,669,730 | 6/1987 | Small . | | 4,922,522 | 5/1990 | Scanlon . |
| 4,671,512 | 6/1987 | Bachman et al. . | | 4,937,853 | 6/1990 | Brule et al. . |
| 4,674,044 | 6/1987 | Kalmus et al. . | | 4,942,598 | 7/1990 | Davis . |
| 4,677,552 | 6/1987 | Sibley, Jr. . | | 4,942,599 | 7/1990 | Gordon et al. . |
| 4,677,553 | 6/1987 | Roberts et al. . | | 4,942,616 | 7/1990 | Linstroth et al. . |
| 4,685,123 | 8/1987 | Hsia et al. . | | 4,943,995 | 7/1990 | Dandelin et al. . |
| 4,688,170 | 8/1987 | Waite et al. . | | 4,955,047 | 9/1990 | Morganstein et al. . |
| 4,692,817 | 9/1987 | Theis . | | 4,959,783 | 9/1990 | Scott et al. . |
| 4,694,490 | 9/1987 | Harvey et al. . | | 4,961,217 | 10/1990 | Akiyama . |
| 4,696,028 | 9/1987 | Morganstein et al. . | | 4,964,157 | 10/1990 | Aoshima . |
| 4,696,029 | 9/1987 | Cohen . | | 4,965,825 | 10/1990 | Harvey et al. . |
| 4,697,282 | 9/1987 | Winter et al. . | | 4,969,183 | 11/1990 | Reese . |
| 4,704,725 | 11/1987 | Harvey et al. . | | 4,969,185 | 11/1990 | Dorst et al. . |
| 4,706,275 | 11/1987 | Kamil . | | 4,972,461 | 11/1990 | Brown et al. . |
| 4,715,061 | 12/1987 | Norwich . | | 4,974,252 | 11/1990 | Osborne . |
| 4,716,583 | 12/1987 | Groner et al. . | | 4,975,945 | 12/1990 | Carbullido . |
| 4,719,647 | 1/1988 | Theis et al. . | | 4,989,233 | 1/1991 | Schakowsky et al. . |
| 4,722,526 | 2/1988 | Tovar et al. . | | 4,992,940 | 2/1991 | Dworkin . |
| 4,745,468 | 5/1988 | Von Kohorn . | | 4,996,705 | 2/1991 | Entenmann et al. . |
| 4,748,668 | 5/1988 | Shamir et al. . | | 5,000,486 | 3/1991 | Run, Jr. et al. ........................... 283/903 |
| 4,756,020 | 7/1988 | Fodale . | | 5,001,710 | 3/1991 | Gawrys et al. . |
| 4,757,267 | 7/1988 | Riskin . | | 5,003,574 | 3/1991 | Denq et al. . |
| 4,761,684 | 8/1988 | Clark et al. . | | 5,014,298 | 5/1991 | Katz . |
| 4,763,191 | 8/1988 | Gordon et al. . | | 5,017,917 | 5/1991 | Fisher et al. . |
| 4,764,666 | 8/1988 | Bergeron . | | 5,018,736 | 5/1991 | Pearson et al. . |
| 4,766,604 | 8/1988 | Axberg . | | 5,023,904 | 6/1991 | Kaplan et al. . |
| 4,774,655 | 9/1988 | Kollin et al. . | | 5,046,183 | 9/1991 | Dorst et al. . |
| 4,781,377 | 11/1988 | McVean et al. . | | 5,083,272 | 1/1992 | Walker et al. . |
| 4,782,510 | 11/1988 | Szlam . | | 5,097,528 | 3/1992 | Gursahaney et al. . |
| 4,783,796 | 11/1988 | Ladd . | | 5,109,414 | 4/1992 | Harvey et al. . |
| 4,783,800 | 11/1988 | Levine . | | 5,127,003 | 6/1992 | Doll, Jr. et al. . |
| 4,785,408 | 11/1988 | Britton et al. . | | 5,146,491 | 9/1992 | Silver et al. . |
| 4,788,682 | 11/1988 | Vij et al. . | | 5,181,238 | 1/1993 | Medamana et al. . |
| 4,788,715 | 11/1988 | Lee . | | 5,233,654 | 8/1993 | Harvey et al. . |
| 4,788,716 | 11/1988 | Zebe . | | 5,255,183 | 10/1993 | Katz . |
| 4,788,718 | 11/1988 | McNabb et al. . | | 5,263,723 | 11/1993 | Pearson et al. . |
| 4,789,928 | 12/1988 | Fujisaki . | | 5,333,185 | 7/1994 | Burke et al. . |
| 4,791,664 | 12/1988 | Lutz et al. . | | 5,335,277 | 8/1994 | Harvey et al. . |
| 4,792,968 | 12/1988 | Katz . | | 5,351,276 | 9/1994 | Doll, Jr. et al. . |

| | | |
|---|---|---|
| 5,353,335 | 10/1994 | D'Urso et al. . |
| 5,403,999 | 4/1995 | Entenmann et al. ............... 379/93.13 |
| 5,835,576 | 11/1998 | Katz ................................... 379/93.13 |

FOREIGN PATENT DOCUMENTS

| | | |
|---|---|---|
| 0 120 322 | 2/1984 | European Pat. Off. . |
| 0 229 170 | 7/1987 | European Pat. Off. . |
| Pub. 0249575 | 12/1987 | European Pat. Off. . |
| Pub. 0295837 | 12/1988 | European Pat. Off. . |
| Pub. 0342295 | 11/1989 | European Pat. Off. . |
| Pub. 0434181 | 6/1991 | European Pat. Off. . |
| 0 568 114 | 11/1993 | European Pat. Off. . |
| 0 620 669 | 10/1994 | European Pat. Off. . |
| 9002131 | 8/1990 | France . |
| OS 2929416 | 2/1981 | Germany . |
| OS 3726366 | 2/1988 | Germany . |
| 4005365 A1 | 8/1990 | Germany . |
| Pub. 52-17740 | 9/1977 | Japan . |
| Pub. 56-152365 | 11/1981 | Japan . |
| Pub. 62-239757 | 10/1987 | Japan . |
| 63-500138 | 1/1988 | Japan . |
| 298158/90 | 12/1990 | Japan . |
| 41855/91 | 2/1991 | Japan . |
| 2184327A | 6/1987 | United Kingdom . |
| 2 230 403 | 10/1990 | United Kingdom . |
| WO 87/00375 | 1/1987 | WIPO . |
| WO88/02966 | 4/1988 | WIPO . |
| WO88/05985 | 8/1988 | WIPO . |
| WO89/02139 | 3/1989 | WIPO . |
| WO89/09530 | 10/1989 | WIPO . |
| WO93/05483 | 3/1993 | WIPO . |

OTHER PUBLICATIONS

Eigen, D.J., et al., "Calling Card Service—Human Factors Studies", The Bell Technical Journal, Sep., 1982.

Lexis Search, Nov. 1, 1984, re: System 85 Computer Process.

Lexis Search, Jan. 28, 1985, re: Rolm Releases Four–Channel Phonemail Voice Message Unit.

"The AT&T Multi–Mode Voice Systems—Full Spectrum solutions . . . " by Hester et al, Sep. 1985.

Lexis Search Results (Great American Potato–Chip giveaway/Raisin Bran Game/Giants Baseball Trivia—Dial info): "In The Chips" AdWeek, Jul. 22, 1985.

"San–Fran–Police–League", Business Wire, Aug. 2, 1985.

"Similar Campaigns", DM News, Dec. 15, 1985.

"Phone Offers Action At Push Of Button", Advertising Age, Feb. 6, 1986.

Boies, Stephen J., "A Computer Based Audio Communication System", Computer Sciences Department, Thomas J. Watson Research Center, Yorktown Heights, New York, USA, pp. 701–704—(Article) (Undated).

Lanzeter, Ygal, "Automatic Number Identification System For Step–By–Step Exchanges", The Ninth Convention of Electrical and Electronics Engineers In Israel, Apr. 1975—(Paper).

Flanagan, J.L., et al., "Speech Synthesis", Chapters 1, 39, 42, 45 and 46—(Chapter from a Book).

"Bell Atlantic's Bolger Wants To Be Free", Telephony, Jul. 14, 1986—(Article).

"Advanced New Cable TV Technology Developed For Impulse–Pay–Per–View", Jun. 3, 1985—(Search).

Noll, M.A., "Introduction to Telephones & Telephone Systems", Second Edition, Chapter 9—(Chapter from a Book).

"Proposal for Kome Mediavoice Interactive Phone/Database Marketing System", "Mediavoice Startup Software Package For Kome" "Optional Mediavoice Software Packages For Kome" "Why ATI Mediavoice Is The Choice For Success"—(Proposal).

Meade, Jim, Dec., 29, 1992—(Letter).

"All About Voice Response", Datapro Research Corporation, Delran, N.J., Mar. 1972 and Sep. 1974—(Article).

"Voice Response in Banking Applications", Datapro Research Corporation, Delran, N.J., Oct. 1974 and Feb. 1983—(Article).

Schiller, T.R., "Field Craft Technician Communication With A Host Computer Synthesized Voice", Proceedings AVIOS '86 Voice I/O Systems Applications Conference, Sep. 16–18, 1986.

Rabin, Richard, "Telephone Access Applications: The Growth Market For Voice Processing", Proceedings AVIOS '86 Voice I/O Systems Applications Conference, Oct. 6–8, 1987.

Schuster, E.R., "B.R.U.T.U.S. Better Registration Using Touch–Tone phones for University Students", Proceedings AVIOS '86 Voice I/O Systems Applications Conference, Oct. 4–6, 1988.

"Exxon's Next Prey. IBM and XEROX", BusinessWeek, Apr. 28, 1980, pp. 92–96 and 103—(Article).

Weinstein, S.B., "Emerging Telecommunications Needs of the Card Industry", IEEE Communications Magazine, Jul. 1984, vol. 22, No. 7, pp. 26–31—(Article).

"Riding Gain", Broadcasting, Mar. 7, 1983—(Article).

Pickup, Mike, "Bank from home, by screen or by phone", Building Society Gazette, Jul. 1988—(Article).

Pickup, Mike, "Voice Response", Computer Systems, Sep. 1986—(Article).

Rabiner, L.R., et al., "Isolated and Connected Word Recognition—Theory and Selected Applications", IEEE Transaction Communications, May 1981, Com. 29, No. 5, pp. 621, 622, 633, 644–646, 655–659—(Article).

Takahashi, K., et al., "The Audio Response System for Telephone Reservation", U.D.C.

Oka, Y., et al., "Development of Ventilating Equipment for Shinkansan Train", U.D.C.—(Articles in Japanese).

Pagones, M.J., et al., "New services follow increased digitization on the long–haul transmission network", AT&T Bell Laboratories Record, 1983, vol. 61, pp. 25–33—(Article).

"New phone service tells customer who's calling", Bell Laboratories Record, 1984, vol. 62, p. 9—(Article).

Hirschman, C.B., et al., "LASS: Putting the telephone customer in charge", Bell Laboratories Record, 1985, vol. 63, pp. 10–16—(Article).

"AT&T building communications network for Defense Department" and "AT&T inaugurates pay–per–view TV", Bell Laboratories Record, 1986, vol. 64, p. 2—(Article).

"Power To . . . ", Dialogic Corporation, Littleton Road,—(unidentifiable Article).

"Representative Customer List For Interface Technology's Total Entry System", "Toes Solutions—Pharmaceutical Manufacturer", "The Voice Response Solution For Answering Customer/Sales Calls", "Toes Solutions—Orthopedic Equipment" and "Toes Solutions—Convenience Store"—(Articles).

Lummis, R.C., "Speaker Verification: A Step Toward the "Checkless" Society", Bell Laboratories Record, pp. 254–259—(Article).

Flanagan, J.L., et al., "Synthetic voices for computers", *IEEE Spectrum*, Oct. 1970, vol. 7, No. 10, pp. 22–45—(Article).

Rabiner, L.R., et al., "Computer Synthesis of Speech by Concatenation of Formant–Coded Words", *The Bell System Technical Journal*, May/Jun. 1971, pp. 1541–1558—(Chapter from a Book).

Flanagan, J.L., et al., "Wiring Telephone Apparatus from Computer–Generated Speech", *The Bell System Technical Journal*, Feb. 1972, pp. 391–397—(Chapter from a Book).

Hornsby, Jr., Thomas G., "Voice Response Systems", *Modern Data*, Nov. 1972, pp. 46–50—(Article).

Diffie, W., et al., "New Directions in Cryptography", *IEEE Transactions On Information Theory*, Nov. 1976, vol. IT–22, No. 6, pp. 644–654—(Article).

Rosenthal, L.H., et al., "Automatic voice response: interfacing man with machine", *IEEE Spectrum*, Jul. 1974, vol. 11, No. 7—(Article).

Rosenthal, L.H., et al., "A Multiline Computer Voice Response System Utilizing ADPCM Coded Speech", *IEEE Transactions on Acoustics, Speech, and Signal Processing*, Oct. 1974, vol. ASSP–22, No. 5, pp. 339–352—(Article).

Flanagan, James L., "Computers that Talk and Listen: Man–Machine Communication by Voice", *Proceedings for the IEEE*, Apr. 1976, vol. 64, No. 4, pp. 405–415—(Article).

Maisel, Ivan, "To Put Your Baseball Savvy On The Line, Pick Up The Phone And Call", *Sports Illustrated*, Sep. 3, 1984—(Script).

Brown, Merrill, "Hollywood Saga: Who Bought J.R.?", *The Washington Post*, Final Edition, Oct. 14, 1984—(Script).

"Special–Olympics; Teams with baseball trivia expert Brad Curtis", *Business Wire*, Sep. 30, 1985—(Script).

Lucas, W.A., et al., "The Spartanburg Interactive Cable Experiments In Home Education", *Rand Corp.*, U.S. Department of Commerce, National Technical Information Service, Feb., 1979—(Publication).

Martin, James, "Viewdata And The Information Society",—(Book).

Gawrys, G.W., "Ushering In The Era Of ISDN", *AT&T Technology*, 1986, vol. 1, No. 1, pp. 2–9—(Article).

Cummings, J.L., et al., "AT&T Network Architecture Evolution", *AT&T Technical Journal*, May/Jun. 1987, vol. 66, Issue 3, pp. 2–12—(Article).

Yates, C.E., "Telemarketing And Technology: Perfect Business Partners", *AT&T Technology*, 1987, vol. 1, No. 3, pp. 48–55—(Article).

Herr, T.J., "ISDN Applications In Public Switched Networks", *AT&T Technology*, 1987, vol. 2, No. 3, pp. 56–65—(Article).

"Only the best. Only from Florafax", *Florafax*—(Advertisement).

Aldefeld, B., et al., "Automated Directory Listing Retrieval System Based on Isolated Word Recognition", *Proceedings of the IEEE*, Nov. 1980, vol. 68, No. 11, pp. 1364–1379—(Article).

Rabiner, L.R., et al., "On the Application of Embedded Training to Connected Letter Recognition for Directory Listing Retrieval", *AT&T Bell Laboratories Technical Journal*, Mar. 1984, vol. 63, No. 3, pp. 459–477—(Chapter from a Book).

Rosenberg, A.E., et al., "Recognition of Spoken Spelled Names for Directory Assistance Using Speaker–Independent Templates", *The Bell System Technical Journal*, Apr. 1980, vol. 59, No. 4, pp. 571–592—(Chapter from a Book).

"The Voicestar Series By Periphonics", *Periphonics*, Jan. 1986—(Publication) "Bank–From–Home system by Periphonics Corporation" "Bill Payment Success Story", *Periphonics Corporation* "A History of Imagination", *Periphonics* "Banking Success Story", *Periphonics Corporation* "Data-Voice and the PDT II", *Periphonics Corporation* "Banking Success Story", *Periphonics Corporation*—(Brochures).

Schulman, Roger, "TeleLearning: The Computer Brings the Classroom Home", *Family Computing*, Sep. 1984, pp. 50–53—(Article).

"ICS launches new ?–home interactive video service package", *Cable Vision*, Sep. 3, 1984, pp. 71/73—(Article).

"The Remarketing of Prestel", *Which Computer?*, Aug. 1984, pp. 106, 107 and ?–(Article).

"Four–Line TeleClerk Calls, Answers, Stores, Surveys", *Hardcopy*, Jan. 1985, vol. 14, No. 1—(Article).

"Peripheral Speaks On Phone", *Hardcopy*, Dec. 1984—(Article).

Page from *What's new in Computing*, Apr. 1985—(Article).

Page from *Today*, A Compuserve Publication, Jun. 1985—(Article).

Page from *Computer Communications*, Feb. 1984, vol. 7, No. 1—(Article).

Gits, Victoria, "Interactive device doesn't interrupt telephone calls", *Cable Vision*, Jun. 17, 1985, p. 20—(Article).

Cuilwik, Tony, "Reach Out & Touch The Unix System", *Unix Review*, Jun. 1985, pp. 50, 52, 53, 56—(Article).

Blackwell, Gerry, "Dial–a–Quote: first Canadian commercial autiotex service", *Computing Canada*—(Article).

Applebaum, Simon, "Two–way television" *Cable Vision*, Aug. 8, 1983, p. 66—(Article).

Sw??ne, Michael, "Fiber–optic TV network lets viewers talk back", *Info World*—(Article).

Morrill, C.S., et al., "User Input Mode and Computer–Aided Instruction", *Human Factors*, 1968, 10(3), pp. 225–232—(Chapter from a Book).

Results of Lexis Search Request for "Dial Info or Dialinfo", Date of Search Apr. 13, 1992, pp. 1–38.

Results of Lexis Search Request for "Phone Programs or International Information Network", Date of Search Apr. 15, 1992, pp. 1–35.

Van Gieson, Jr. W.D., et al., "Machine–Generated Speech For Use With Computers, and the problem of fitting a spoken word into one half second", *Computers and Automation*, Nov. 1968, pp. 31–34—(Article).

Patel, Jay, "Utility of voice response system depends on its flexibility", *Bank Systems & Equipment*, Dec. 1988, pp. 101/103—(Article).

Buron, R.H., "Generation of a 1000–Word Vocabulary for a Pulse–Excited Vocoder Operating as an Audio Response Unit", *IEEE Transactions On Audio And Electroacoustics*, Mar. 1986, vol. AU–16, No. 1, pp. 21–25—(Article).

Gaines, B.R., et al., "Some Experience in Interactive System Development and Application", *Proceedings of the IEEE*, Jun. 1975, vol. 63, No. 6, pp. 894–911—(Article).

"Application For Registration Of Equipment To Be Connected To The Telephone Network", *Federal Communication Commission*, FCC Form 730.

Dudley, Homer, "The Vocoder", Circuit Research Department, Dec. 1939, pp. 122–128—(Chapter from a Book).

"Voice Response System Order Entry, Inventory Control".

"Vendor Index", *Audiotex Directory & Buyer's Guide*, Fall/Winter 1989/1990, pp. 114–156.

Francas, M., et al., "Input Devices For Public Videotex Services", *Human–Computer Interaction—Interact '84*, 1985, pp. 171–175—(Paper).

Labrador, C., et al., "Experiments In Speech Interaction With Conventional Data Services", *Human–Computer Interaction—Interact '84*, 1985, pp. 225–229—(Paper).

Long, J., et al., "Transaction Processing Using Videotex or: Shopping on Prestel", *Human–Computer Interaction—Interact '84*, 1985, pp. 251–255—(Paper).

*Electrical Communication*, 1981, vol. 56, Nos. 1–4, pp. 1–110—(Paper).

Conway, R.W., et al., "Tele–CUPL: A Telephone Time Sharing System", *Communication of the ACM*, Sep. 1967, Vol. 10, No. 9, pp. 538–542—(Article).

Marill, T., et al., "Data–Dial: Two–Way Communication with Computers From Ordinary Dial Telephones", *Communications of the ACM*, Oct. 1963, vol. 6, No. 10, pp. 622–624—(Article).

Witten, I.H., "Communicating With Microcomputers", pp. 121–158—(Chapter from a Book).

"Call–It–Co. Hangs Up On Dial–It In Four Markets", *The 976 Exchange*, 1984, vol. 2, pp. 1–6 (Article).

"DECtalk Help Boston's Shawmut Bank Cut Costs And Improve Service", *Digital*—(Article).

"VTK 81 Voice Computer", *Voicetek*, 1987 (Brochure).

"How a Computerized "Voice" Answers Customers' Inquiries", *Bank Automation Newsletter*, Feb. 1985, vol. 19, No. 2 (Article).

Rickman, J., et al., "Speech Synthesizers—Communications Interface—Implementing A Touch Tone Telephone Talker With DECtalk", *The DEC Professional*, May 1985, pp. 38, 39, 42–44 (Article).

"DECTALK Delivers", *Digital Review*, Sep. 1985—(Article) "DECtalk turns a telephone into a terminal",—"UNIX and Digital",—"Legal protection for semiconductor chips",—"Product safety",—*DECWORLD*, Apr. 1985, vol. 9, No. 2, pp. 1,3,5,6–8—(Article).

"DECtalk: A New Text–to–Speech Product" *Digital Guideline*, Mar. 1984, vol. 8, No. 3, pp. 1–8—(Article).

*Straight Talk*, A Newsletter about the DECtalk Speech Synthesizer from Digital Equipment Corporation, vol. 1, No. 1, pp. 1–6.

*Straight Talk*, A Newsletter about the DECtalk Speech Synthesizer from Digital Equipment Corporation, vol. 1, No. 2, pp. 1–7.

*Straight Talk*, A Newsletter about the DECtalk Speech Synthesizer from Digital Equipment Corporation, vol. 1, No. 3, pp. 1–8.

*Straight Talk*, A Newsletter about the DECtalk Speech Synthesizer from Digital Equipment Corporation, vol. 1, No. 4, pp. 1–8.

*Straight Talk*, A Newsletter about the DECtalk Speech Synthesizer from Digital Equipment Corporation, vol. 2, No. 2, pp. 1–8.

*Straight Talk*, A Newsletter about the DECtalk Speech Synthesizer from Digital Equipment Corporation, vol. 2, No. 4, pp. 1–8.

Various References/Articles attached with a letter from Smithwin Associates, dated Apr. 22, 1992.

Riley, A.A., "Latest: 2–way communication by computer and telephone".

??evens, W.?., "Computer Helps Children to Add", *The New York Times*, Apr. 20, 1970.

Harvey, R.W., *Times*, The Kiplinger Magazine.

"A Computerized System ???", Nov. 23, 1970, p. 14, (unidentifiable Article).

"Hardware for the 'cashless society'", *Electronic Design 3*, Feb. 4, 1971, p. 26.

Tennant, R.P., "Advanced credit system smooths operation and hastens payout", *Data Processing Magazine*, Jun. 1971, vol. 13, No. 6, pp. 34–35.

"Computers that talk back to you", *Business Week*, Date ??.

Smith, Gene, "Chatting Via Computer", *New York Times*, Sep. 12, 1971.

*EDP Weekly*, (unidentifiable Article).

"Did Anybody Here Call a Computer", *Data Management*, Feb. 196?.

Skala, Martin, "Straight talk from a computer", *Christian Science Monitor*, Jun. 14, 1973.

"Computer for Watergate Probe", *Science*, Jun. 15, 1973.

"Tapping AT&T for a $50–million refund", *Business Week*, Jun. 9, 1973.

"Distrust of computer kills home service plan".

Scherer, Ron, "Chitchat with a computer", *Christian Science Monitor*, Apr. 16, 1975, p. 2.

"Trying Out the Pay–by–Phone Service", *Technology Review*, Mar./Apr. 1976, p. 15.

"Pentagon seeks more control", *Electronics*, Apr. 5, 1976, p. 39.

"Everyman's Computer Terminal", *Industrial Research*, Mar./Apr. 1976, p. 14.

"DOD could save on test equipment".

"Talking computer speeds Ford parts", Apr. 25, 1976.

"Customers of Ten Banks Paying Bills by Phone", *Computer World*, 1976, p. 12.

"FAA to test computerized voice response to queries from pilots", *Electronics*, Nov. 25, 1976, p. 43.

Miller, F.W., "Voice Response Comes to Life with Order Entry", *Infosystems*, Oct. 1981, pp. 62/64.

Suppes, Patrick, "University–Level Computer–Assisted Instruction At Stanford: 1968–1980", *Institute for Mathematical Studies In The Social Sciences, Stanford University*, 1981, pp. 589–716.

Lerner, E.J., "Products that talk", *IEEE spectrum*, Jul. 1982, pp. 32–37.

Carlsen, Clifford, "Megaphone plans to blare message on national scale", *Times*, Mar. 2, 1987.

Michelson, Marlene, "All kinds of information at your fingertips by phone", *Business Times*, Sep. 8, 1986, vol. 3, No. 19.

Lacter, Mark, "At Megaphone, It's Always Show Time", *San Francisco Chronicle*, Jun. 9, 1986.

Table of Contents, *Megaphone Press Book*, pp. 1–3.

"Miss Simpson, will you dial–a–joke for me please?", Cartoon.

Lacter, Mark, "At Megaphone, It's Always Show Time", *San Francisco Chronicle*, Jun. 9, 1986, Year No. 123, (different perspective).

Lacter, Mark, "Narrating Fantasy Messages—It's No Dream Job", *San Francisco Chronicle*, Jun. 9, 1986.

"Megaphone Serves High–Tech Showbiz", *San Francisco Chronicle*, Jun. 9, 1986.

"Megaphone Reaches Unique Market", *San Francisco Chronicle*, Jun. 9, 1986.

Feuer, Jack, "Asher/Gould: Megaphone Dials–a–Shop", *Adweek*, May 12, 1986.

Symanovich, Steve, "Novelty over for phone porn vendors", and continuation "Big firms breathing down necks of small phone porn outfits" *San Francisco Business Journal*, May 5, 1986.
Wilke, John, "A 'Dream' Business That's Just A Phone Call Away", *Information Processing*.
Ketcham, D.E., "Dial–a–You–Name–It", *San Francisco Chronicle*, 1986.
Carter, Alan, "What? You didn't know Erica was engaged again?", *Daily News*, Mar. 12, 1986.
"Firm plugs into sales with time, temp lines", *Crain's New York Business*, Mar. 3, 1986, vol. II, No. 9.
Pitts, Gail, "Phone–in trivia games ring up profits", *The Denver Post*, Feb. 3, 1986.
"Merge Towards Success" IIN and Megaphone, *The 976 Exchange*, Winter 19?6, vol. 4.
Nelson, David, "From dating to soap operas, 976 numbers come on line", *San Jose Business Journal Magazine*, Jan. 27, 1986.
Greengard, Samuel, "Dial–A–Deluge", *Business*, Nov. 1985.
"Numbers, Please", *Business*, Nov. 1985.
"The 976 Telelease Co.", *Business Opportunities Journal*, Dec. 1985.
"One–time refund for '976' charges", *San Francisco Examiner*, Nov. 7, 1985.
Kent, Debra, "Interactive phone network stretches for calls", *Advertising Age*, Oct. 17, 198?.
"Making Your Phone Talk To Computers", *U.S. News*, Sep. 23, 1985.
Mulqueen, John, "Int'l Information Network Eyes Contact With British Telecom", *Communications Week*, Sep.??.
Moorhead, Derrol, "Humor, romance: just a call away", *Rocky Mountain Collegian*, Sep. 19, 1985, vol. 94, Iss. 32.
Keppel, Bruce, "Move Under Way to Curb Abuse of Popular Dial–It Service", *Los Angeles Times*, Sep. 1, 1985.
"Dial–a–stock", *Forbes*, Aug. 1985.
Sowa, Tom, "Games people play now include phone trivia", *Spokesman–Review*, Jul. 1985.
Dougherty, P.H., "Advertising Telephone Is Growing As Medium", *The New York Times*, Jul. 17, 1985.
Larson, Judy, "976 numbers entice adults—and kids", *Fremont Argas*, July 8, 1985.
Barbieri, Richard, "Prime Time for the Telephone", *Channels*, May/Jun. 1985, pp. 54–55.
"Bank Provides Financial Fuel to Fast Track Company", *The Financial Center Bank*, First Quarter 1985, vol. 11, No. 1.
"Don't Phone Santa", *San Francisco Chronicle*, Letters to the Editor, Mar. 29, 1985.
Carvalho, Deborah, "Will Hillary find happiness with Bob?", *Contra Costa Times*, Mar. 15, 1985.
Murphy, Win, "Dial–a–romance", Mar. 13–19, 1985.
?, Martha, "Love, laughs, luck: Just a phone call away", *Burlington County Times*, Feb. 17, 1985.
Robinett, Stephen, "Blood From A Rock", *Venture*, Jan. 1985, pp. 38–41, 44–45.
Du Brow, Rick, "Lates hot lines for instant trivia pursuit", *Los Angeles Herald Examiner*, Dec. 6, 1984.
"Keep up with your favorite soap operas", *Contra costa Times*, Nov. 30, 1984.
Hanna, Barbara, "Inside Radio/TV".
Behr, Debra, "'Victory' makes and writes its own on–the–road news", and "Whose calling? Michael fans most likely . . . ", *Los Angeles Times*, Nov. 29, 1984.

"Newcomer Megaphone Has Magnanimous Goals", *The 976 Exchange*, Fall 1984, vol. 2.
"Phone Santa", *Vecaville Reporter*, Nov. 10, 1984.
"Dial 976 for Profits", *Time*, Sep. 3, 1984.
Pendleton, Mike, "For A Fee Your Phone Can Inform", *Burrelle's*, Jul. 19, 1984.
"Phone numbers to get details about soaps", *Burrelle's*, Jul. 18, 1984.
Gansberg, A.L., "976 phone prefix as new entertainment fad", *The Hollywood Reporter*, Jun. 21, 1984.
Carvalho, Deborah, "Another 'GH' actor discontented with the soap", *Contra Costa Times*, May 26, 1984, p. 4.
"Keep up with your favorite soap operas", *San Francisco Examiner*.
Du Brow, Rick, "'Dial–a–soap' service offers daily TV summaries", *Los Angeles Herald Examiner*, Apr. 26, 1984. . .
News briefs, Feb. 1966.
Martin, J., et al., "The Computerized Society—An apprisal of the impact of computers on society over the next fifteen years", Chapter 10, pp. 211–226—(Chapter from a Book).
New products, *Datamation*, Jul. 1966, vol. 12, No. 7, pp. Jul. 1989—(Article).
Meacham, L.A., et al., "Tone Ringing and Pushbutton Calling", *The Bell System Technical Journal*, 1958, pp. 339–360—(Book).
Suppes, Patrick, "The Uses of Computers in Education", *Scientific American*, Sep. 1966, vol. 215, No. 3, pp.— (Article).
Bruckert, E., et al., "Three–tiered software and VLSI aid developmental system to read text aloud", *Electronics*, Apr. 21, 1983, pp. 133–138—(Article).
Hochman, David, "Implementing Automatic Number Identification", *Telecommunications*, Dec., 1978, vol. 12, No. 12—(Article).
Martin, James, "Telecommunications and the Computer", 2nd Edition, Introduction, pp. 20–23, Chapter 5, pp. 94–95, Chapter 18—(Chapter from a Book).
Martin, James, "Telematic Society", Chapter 6, pp. 45–48, Chapter 9, pp. 67–69, Chapter 20, pp. 181–188—(Chapters from a Book).
Martin, James, "The Wired Society", pp. 53–55, 71–79, 99–100, 204–205, 229–231—(Chapters from a Book).
Martin, James, "Future Developments in Tele–Communications", 2nd Edition, Box A, Chapter 1, p. 5, Chapter 7, pp. 95–111, Chapter 9, pp. 149–105, Chapter 12, pp. 207–209, Chapter 18, pp. 310–311, Chapter 19, pp. 314–317, 320, Chapter 20, pp. 330, Chapter 23, pp. 379–401—(Chapters from a Book).
Ferrarini, E.M., "Infomania", pp. 59–61, 176–177, 191, 213–214, 223, 245, 250, 257, 285, 286—(Book).
Kimura, Y., et al., "Audio Response System", vol. 55, No. 10, pp. 49–54—(Article in Japanese).
Takano, H., "Characteristics of Multipair Exchange Area Telephone Cable with Cellular Polyethylene Insulation by Gas Injection Blouing", p. 55—(Article in Japanese).
Takahashi, T., et al., "SR–2000 Voice Processor and Its Application", *NEC Research and Development*, 1984, No. 73, pp. 98–105—(Paper).
"Concept Diagram Voicemail International System".
"Voicemail Instruction Manual", *Televoice International*, Jun. 1981, Index.
Eckhouse, John, "Voice mail spells relief for phone frustration", *San Francisco Examiner*, Feb. 7, 1982—(Article).

Meade, Jim, "Throw away those pink Call–back slips", *InterOffice*, Jan./Feb. 1984, vol. 3, No. 1—(Article).
Welsh, Jack, "Everybody's Talking About Talking Bouquets", *Design for Profit*, Spring 1986, pp. 7–10—(Article).
Mosco, Vincent, "Pushbutton Fantasies", Contents, Chapter 3 and 4, pp. 67–118—(Chapters from a Book).
Bretz, Rudy, "Media for Interactive Communication", Chapter 5, pp. 110–116, Chapter 7, pp. 143–153—(Chapters from a Book).
Robinson, G., et al., ""Touch–Tone" Teletext A Combined Teletext–Viewdata System", *IEEE Transactions on Consumer Electronics*, Jul. 1979, vol. CE–25, No. 3, pp. 298–303—(Article).
Voice News, Mar. 1982.
Voice News, Jun. 1982, *William W. Creitz*.
Voice News, Oct. 1982, p. 5.
Voice News, Nov./Dec. 1983.
"Consultant Report 28?", *AIS American Bell Advanced Information Systems*, Apr. 1983, pp. 27, 118–119, 123–124—(Report).
"T–1 Board Sets Deliver High Performance All Digital T–1 Solutions", *NMS Natural MicroSystems*—(Product Bulletin).
"VBX Product Family Overview", *NMS Natural MicroSystems*, pp. 1–20—(Brochure).
"Machine Operation Manual", May 12, 1978, Issue 1, pp. 1–3, 9–10—(Manual).
Davey, J.P., "Dytel Western Region Sales Training Manual", 1985—(Manual).
Gutcho, Lynette, "DECtalk—A Year Later", *Speech Technology*, Aug./Sep. 1985, pp. 98–102—(Article).
Daniels, Richard "Automating Customer Service", *Insurance Software Review*, Aug./Sep. 1989, pp. 60–62—(Article).
Golbey, S.B., "Fingertip Flight Service", Oct. 1985—(Article).
"ARO Goes Pushbutton", *Newsletter*, Nov. 1985, p. 9—(Article).
"ROLM Centralized Attendant Service", *ROLM Corporation*, 1979.
"AIS, Versatile Efficient Information Service", *Fujitsu Limited*, 1972, pp. 153–162—(Brochure).
Smith, S.L., et al., "Alphabetic Data Entry Via the Touch–Tone Pad: A Comment", *Human Factors*, 1971, 13(2), pp. 189–190—(Book).
Holtzman, Henry, "Still an Infant Technology Voice Mail", *Modern Office Technology*, Jun. 1985, pp. 78–80, 82, 84, 90—(Article).
Leander, Monica, "Voice Response—A Technology for Solving Management Problems", *Speech Technology*, Mar./Apr. 1986, pp. 50–52—(Article).
Stolker, Bud, "CompuCorder speech storage and output device. (evaluation)", *Creative Computing*, Jul. 1983, pp. 1–7.
Witten, I.H., et al., "The Telephone Enquiry Service: a man–machine system using synthetic speech", *Int. J. Man–Machine Studies*, Jul. 1977, 9, pp. 449–464—(Book).
Gould, R.L., "Fidelity's Automated Voice Response System", *Telecommunications*, Jan. 1981, pp. 27–28—(Article).
"Fidelity Automated Service Telephone", *Fidelity Group*, 4 pages—(Manual).
"Data Set 407 Interface Specification", *Manager—Data Systems & Operations*, Jun. 1975, Issue 2, pp. 1–69 plus Table of Contents—(Manual).

Fitzwilliam, J.W., et al., "Transaction Network, Telephones, and Terminals", *The Bell System Technical Journal*, Dec. 1978, vol. 57, No. 10, pp. 3325–3537—(Book).
*Inbound Outbound*, May 1988, complete issue.
Koch, Helmut, "Concord Design Services, Inc. Corporate Description", *Exacom* Federal Communications Commission, FDC Form 484, Registration, Registrant: Concord Design Services, Inc. *Exacom Telecommunication Systems*—Brochure.
General Description Installation and Operation Manual for Direct Inward Dial (DID) Trunk Interface Unit, *Exacom Telecommunication Systems*, Nov. 21, 1989, Issue3—(Manual).
General Description Installation and Operation Manual for Asnwering Service Monitor System, *Concord Design Services, Inc.*, Dec. 19, 1986, Issue 1—Manual.
"Dialogic Voice Solutions", *Dialogic Corporation*, pp. 1–72.
"Why Is T–1 Important And How Can It Be Used", *Dialogic Corporation*, Application Note, pp. 1–6.
"Use of Dialogic T–1 For Telemarketing Applications", *Dialogic Corporation*, Application Note, pp. 1–6.
"Use of Dialogic T–1 In Operator Service Applications", *Dialogic Corporation*, Application Note, pp. 1–6.
"Use of Dialogic T–1 In Telephone Company Networks", *Dialogic Corporation*, Application Note, pp. 1–10.
"Use of Dialogic T–1 Equipment in CPE Gateways", *Dialogic Corporation*, Application Note, pp. 1–4.
"Integrating Analog Devices into Dialogic–Based T–1 Voice Processing Systems", *Dialogic Corporation*, Application Note, pp. 1–16.
"Use of Dialogic Components in Automatic Number Identification (ANI) Systems", *Dialogic Corporation*, Application Note, pp. 1–16.
"Dialogic Unit Pricing", pp. 1–6.
"Voice '92 Spring Conference & Exposition", 1992, pp. 1–24—(Brochure).
"Telecom Developers'92", Jan. 1992—(Advertisement).
Newton, Henry, "The Sheer Thrill Of It All", *Teleconnect*, May 1991.
"AFIPS Conference Proceedings", 1987 National Computer Conference, Jun. 15–18, 1987, Chicago, Illinois "Dynamic Network Allocation".
"Calling your computer is as easy as calling your broker, says AT&T", *Record*, Nov. 1985.
Singleton, L.A., "Telecommunications in the Information Age", Chapter 12, pp. 115–125—(Chapter from a Book).
Weitzen, H.S., "Telephone Magic", pp. 28–31, 38–39, 54–55, 62–67, 70–79, 82–85, 88–91, 106–115, 118–121, 126–127, 134–137, 176–177, Index—(Chapters from a Book).
Weitzen, H.S., et al., "Infopreneurs", pp. 18–19, 138–145, 206–209, Index—(Chapters from a Book).
Sullivan, Kathleen, "Paper firm relies on voice–based inventory system", *IDG Communications, Inc.*, Sep. 10, 1984—(Script).
"VTK Training Section" and "Disk Initialization Procedures for VTK–30/60", *Voicetek Corporation*—(Manual).
"VoiceStor Systems Integration Guide", *Voicetek Corporation*, May 2, 1983—(Manual).
"VTK 60 Voice Computer—Technical Description", *Voicetek Corporation*, Oct. 1986—(Manual).
"Voicetek VS–50 Telephone Interface System", Apr. 25, 1984, System Integration Guide—(Manual).

"VTK Voice System—Programmers Guide", *Voicetek—* (Manual).

"Disk Initialization Procedures for VTK–30/60", *Voicetek Corporation*—(Manual).

"VTK81 Voice Computer—Technical Description", *Voicetek Corporation*, Oct. 1986—(Manual).

"VTK Voice System—VTK/CE Guide", *Voicetek*, Jul. 6, 1987—(Manual).

Newton, Harry, "Newton's Telecom dictionary", *Telecom Library Inc.*, 1991—(Advertisement).

"1987 Buyers Guide", *Teleconnect*, Jul. 1987, pp. 194, 197–210—(Brochure).

Syntellect Inc.—Advertisements.

"Let your fingers do the tapping . . . and the computer the talking," Modern Office Tech., May 1984 at 80.

"American Software unveils systems for IBM mainframes," Computerworld, Mar. 26, 1984 at 59.

"Business Units Get Order Entry," Computerworld, Jul. 12, 1982 at 36.

Kramer, J.J., "Human Factors Problems in the Use of Pushbutton Telephones for Data Entry", *Bell Telephone Laboratories*, Holmdel, N.J., Apr. 74, pp. 241–258—(Paper).

Cox, Jr., Floyd, "Flora Fax", Jan. 22, 1986—(Letter and Advertisements).

Isayama, Tetsuya, "Automatic Response Processing Equipment as a Multi–media Communication Node", *Japan Telecommunications Review*, 1987, vol. 29, No. 1, pp. 29–36—(Article).

Imai, Y., et al., "Shared Audio Information System Using New Audio Response Unit" *Japan Telecommunications Review*, Oct. 1981, vol. 23, No. 4, pp. 383–390—(Article).

"Distrust of computer kills home service plan" (date and source missing).

"Automatic Call Distributor/Management Information System: Interface between 1/1AESS™ Switch Central Office and Customer Premises Equipment", *Bell Communications Research*, Dec. 1986, Technical Reference TR–TSY–000306, Issue 1—(Article).

"Comparison Of ACD Systems", *Connection*, Feb. 1990—(Chart).

"ACD Comparison", *Aspect*, Feb. 2, 1990—(Final Report).

"AT&T's Response to Plaintiff's Second Set of Interrogatories to Defendant AT&T Corp. (Nos. 17–18)", *Ronald A. Katz Technology Licensing, L.P. and MCI Telecommunications Corp.*, Civil Action No. 97–4453(USDC,ED PA).

Smith, S.L., "Computer–Generated Speech and Man–Computer Interaction", *Human Factors*, 1970, 12(2), pp. 215–223—(Article).

Newhouse, A., et al., "On The Use Of Very Low Cost Terminals", *University of Houston*, pp. 240–249—(Paper) (Undated).

Mullen, R.W., "Telephone—home's 'friendliest' Computer", *Inside Telephone Engineer And Management*, May 15, 1985, vol. 89, No. 10,—(Article).

"Telephone Computing Entering Service Bureau Business", *American Banker*, Jul. 5, 1979—(Article).

Kutler, Jeffrey, "Technology, System Sharing Improve Phone Banking Outlook", *American Banker*, Dec. 7, 1979, vol. CXLIV, No. 237—(Article).

Kutler, Jeffrey, "Phone Bill Paying Accessed by Pioneer", *American Banker*, Dec. 7, 1979, vol. CXLIV, No. 237—(Article), "User's Guide", *Dowphone* (undated).

"Audiotex Information From Dow Jones", *The Computer Review*, Nov. 1984, vol. 2, No. 1—(Article).

"Dow Phone Adds Innovest Systems' Technical Analysis Reports" *IDP Report*, Jan. 3, 1986—(Report).

Perdue, R.J., et al., "Conversant 1 Voice System: Architecture and Applications", *AT&T Technical Journal*, Sep./Oct. 1986 —(Article).

Martin, James, "Design of Man–Computer Dialogues", *IBM System Research Institute*, Chapter 16, pp. 283–306—(Chapter from a Book) (Undated).

Kaiserman, D.B., "The Role Of Audio Response in Data Collection Systems", *Proceedings of the Technical Sessions*, Paleis des Expositions, Geneva, Switzerland, Jun. 17–19, 1980, pp. 247–251—(Article).

Boies, S.J., et al., "User Interface for Audio Communication System", *IBM Technical Disclosure Bulletin*, Dec. 1982, vol. 25, No. 7A, pp. 3371–3377—(Article).

Levinson, S.E., et al., "A Conversational–Mode Airline Information and Reservation System Using Speech Input and Output", *The Bell System Technical Journal*, Jan. 1980, vol. 59, No. 1, pp. 119–137.

Emerson, S.T., "Voice Response Systems—Technology to the Rescue for Business Users", *Speech Technology*, Jan./Feb. '83, pp. 99–103—(Article).

Moslow, Jim, "Emergency reporting system for small communities", *Telephony*, Feb. 11, 1985, pp. 30–32, 34—(Article).

Rabiner, L.R., et al., "Digital Techniques for Computer Voice Response: Implementation and Applications", *Proceedings Of The IEEE*, Apr. 1976, vol. 64, No. 4, pp. 416–432—(Article).

Moosemiller, J.P., "AT&T's Conversant™ I Voice System" *Speech Technology*, Mar./Apr. 1986, pp. 88–93—(Article).

Frank, R.J., et al., "No. 4 ESS: Mass Announcement Capability", *The Bell System Technical Journal*, Jul./Aug. 1981, vol. 60, No. 6, Part 2, pp. 1049–1081—(Chapter from a Book).

"Chapter I General Description" *D.I.A.L. PRM/Release 3—Version 2* Mar. 1987 (Product Reference Manual).

"Announcing Release 3.3" *D–A–S–H– D.I.A.L. Application and Support Hints*, Jan./Feb. Mar. 1987, vol. 3, No. 1—(Brochure).

"D.I.A.L. Software Relase 4", *OPCOM*, Jan. 1988, Version 1—(Product Reference Manual).

Brady, R.L., et al., "Telephone Identifier Interface", *IBM Technical Disclosure Bulletin*, Oct. 1976, vol. 19, No. 5, pp. 1569–1571—(Article).

Corbett, A.J., "Telephone Enquiry System Using Synthetic Speech", *University of Essex*, Dec. 1974, (Thesis).

Yoshizawa, K., et al., "Voice Response System for Telephone Betting", *Hitachi Review*, Jun. 1977, vol. 26, No. 6—(Article).

Sagawa, S., et al., "Automatic Seat Reservation By Touch–Tone Telephone", *Second USA Japan Computer Conference*, 1975, vol. 2, pp. 290–294—(Article).

"AT&T 2: Reaches agreement with Rockwell (ROK)", Aug. 26, 1986—(Press Release).

"AT&T: Expands Computer speech system product line", Apr. 14, 1986—(Press Release).

Adams, Cynthia, "Conversing With Computers", *Computerworld on Communications*, May 18, 1983, vol. 17, No. 20A, pp. 36–44—(Article).

Hester, S.D., et al., "The AT&T Multi–Mode Voice Systems—Full Spectrum For Speech Processing Applications", Sep. 1985, pp. 1–10—(Proceedings Of The 1985 AVIOS Conference).

Davidson, Leon, "A Pushbutton Telephone For Alphanumeric Input", *Datamation*, Apr. 1966, pp. 27–30—(Article).

Advertisement: Cuervo Gold Beach Chair, VoiceMail Int'l, '83.

"Digital's All–In–1 Voice Messaging", *Digital*—(Brochure) (Undated).

"Access Voice and Mail Messages From One Familiar Source", *Insight*,—(Article) (Undated).

"Get The Message . . . !" "New VoiceMail Features", *Voicemail International, Inc.*, Oct. 1984—(Article).

Brochures (TWA Crew Scheduling/PSA's Reservation System/Universal Studios Program/Dow Phone): "AVIAR The communication system that keeps you flying", VoiceMail Int'l,—(Brochure)(Undated).

"TWA Voicemail, Flight Attendants Users Guide" Aug. 1986,—(Brochure).

Holtzman, Henry, "Voice Mail Soars At TWA", *Modern Office Technology* (Reprint), Mar. 1986,—(Article).

"Bid Results via Voicemail—Flight Deck Crew Members", May 1, 1985,—(Script).

Borden, W.S., "Flight Attendant Self Input Of Monthly Bids Via Touch Tone Telephone", *In–Flight Services Bulletin*, Sep. 15, 1985—(Memo).

"Look Ma, no operators! Automatic voice system doesmany airline jobs", *Air Transport World*, Oct. 1986—(Article).

"1,000,000 Shares Common Stock" *Voicemail International, Inc.,*, Jan. 10, 1984—(Public Offering Summary).

Winckelmann, W.A., "Automatic Intercept Service", *Bell Laboratories Record*, May 1968, vol. 46, No. 5, pp. 138–143—(Article).

"Proposed Agreement Between National Enterprises Board (N.E.B.) and Delphi", Jan. 30, 1979.

Voysey, Hedley, "Nexos wins rights to comms engine", *Computing*, Sep. 6, ??, vol. 7, No. 36—(Article).

"Appraisal Of The Fair Market Value of Delphi Communications", Apr. 30, 1980—(Study) Delphi Communications—(Charts and Exhibits).

"Voice–Response System Improves Order Entry, Inventory Control", *Communication News*, Aug. 1976—(Article).

"Periphonics Voicepack"—(Brochure)(Undated).

"The Voice Response Peripheral That Turnes Every Touch–Tone Telephone Into A Computer Terminal", Periphonics Corporation—(Brochure)(Undated).

Rabin, Jeff, "Minorities Seek 30% Share of All Lottery Operations", *Sacramento Bee*, Apr. 12, 1985—(Article).

Advertisements (Dial Giants Baseball Trivia Game): *San Francisco Chronicle*, Jul. 3, 1984.

Curtis, Cathy, "976 numbers let you dial–a–whatever", *San Francisco Business Journal*, Nov. 26, 1984—(Article).

Ferrell, Jane, "Three little numbers for instant information", *San Francisco Chronicle*, Aug. 15, 1984—(Article).

"Dallas Telephone Call–In Game Uses Computer Voice Interface", Sep. 24, 1984—(Press Release).

Rivest, R.L., et al., "A Method for Obtaining Digital Signatures and Public–Key Cryptosystems", *Communications of the ACM*, Feb. 1978, vol. 21, No. 2, pp. 120–126—(Article).

Finnigan, Paul F, "Audiotex: The telephone as data–access equipment", *Data Communications*, 1987, pp. 155–161 (Article).

Ozawa, Y., et al., "Voice Response System and Its Applications", *Hitachi Review*, Dec. 1979, vol. 28, No. 6, pp. 301–305—(Article).

Various copies of Business cards.

Guncheon, M.C., "The Incredible Dial–A–Message Directory", *Contemporary Books, Inc.*, 1985—(Directory).

"Voice Box Maintenance Manual", *Periphonics*, 1986— (Manual).

"Voicepac Maintenance Manual", *Periphonics*, 1984— (Manual).

Dyer, Ellen, "Wichita Firm Sells 25% Share", Dec. 14, 1987, and "Spectrum Carving Role In Volatile Business", Jul. 7, 1986, Search Results.

"Don't Miss The Unique Gift Idea Of The Year", *Yam Educational Software*, 1987—(Advertisement).

"Welcome to the future of advertising.", *Teleline, Inc.*, 1990—(Presentation).

"Greeting Card Project", *Teleline, Inc.*, Nov. 7, 1988— (Flow Chart).

Sharkey, Betsy, "Dialing for Dollars and Date", *Adweek*, Nov. 16, 1987, pp. 6–8—(Article).

Gay, Verne, "CBS may tie rates to buying p?", 1988— (Article).

Flanagan, J.L., et al., "Synthetic Voices For Computers", *IEEE International Conference on Communications*, 1970, pp. 45–9—45–10—(Conference Record).

Rabiner, L.R., et al., "Computer Voice Response Using Low Bit Rate Synthetic Speech", *Digest IEEE 71 International Convention*, Mar. 22–25, 1971, p. 1–2, Fig. 1–2—(Paper).

"DT1000 Digitalker Speech Synthesis Evaluation Board", *National Semiconductor Corp.*, Oct. 1980—(Manual).

"Data Set 407C Interface Specifications Nov. 1977", *Bell System Technical Reference*, Nov. 1977, pp. 1–50—(Paper).

Broomfield, R.A., et al., "Making a data terminal out of the Touch–Tone telephone", *Electronics*, Jul. 3, 1980, pp. 124–129—(Paper).

Godfrey, D., et al., "The Telidon Book—Designing and Using Videotex Systems", pp. 1–103—(Book).

"Industry Marketing Bulletin", *Honeywell EDP Wellesley Hills*, Aug. 9, 1967.

"Honeywell Communications Configuration Charts And Aids In Designing", *Data Communications*, pp. 3–1—3–7 and A.

"Burroughs Audio Response System", Reference Information for Sales Representatives, pp. 1–6 "New Product Announcement", *Burroughs Corporation*, Feb. 5, 1968.

"Stand–Alone Lockbox Application Voice Response (Slave) Communication System Functional Specification", *Cognitronics Corporation*, Feb. 19, 1982, p. 21.

"Unlock lockbox reporting, with Cognitronics Voice Response Communications System/Banking.", *Speech––maker a division of Cognitronics Corporation*.

"Voice Response for Banking", *Cognitronics Corporation* (Brochure).

"voice response application brief", *Speech–maker*—(Brochure).

"Instant credit authorization is an easy touch when any telephone is a voice response computer terminal", *Speech–maker a division of Cognitronics Corporation*—(Article).

Slutsker, Gary, "Relationship marketing", *Forbes*, Apr. 3, 1989—(Article).

Finnigan, P.F., "To Our Shareholders", Jun. 1985, Apr. 7, 1986, Apr. 10, 1987—(Letters).

"International Programs" (Voicemail).

Finnigan, P.F., "Our guest", *Radio–Schweiz AG Telekommunikation und Flugsicherung*, Jan. 1983, pp. 12–14—(Bulletin).
Finnigan, P.F., "Voice mail", *1983 National Computer Conference*, May 16–19, 1983, Anaheim, CA, pp. 375–377 and Abstract.
"Conversations in Your Mailbox", *Software News*, Jan. 1985—(Article).
Fredric, Paul, "Voicemail Int'l, Radio Page America To Offer A 'Pocket News Network'", *Communications Week*, Jul. 8, 1985—(Article).
"Voice–Messaging System: Use It While You're In, Not Out", *Information Week*—(Article).
"Corporate Performance—Companies to Watch", *Fortune*, Sep. 30, 1985—(Article).
"Dream Weaver", *Jon Lindy*, Aug. 1986, pp. 32–35, 37—(Article).
"Turn any telephone into a complete electronic message service", *Voicemail*—(Brochure).
Pages from Company Brochure, *Televoice International, Inc.*
"VMI Big Talker", *Voicemail International, Inc.*—(Newsletter).
"Newsline", *Voicemail International, Inc.*, Oct. 1984 and Nov. 1984.
"Voiceletter No. 1", *Voicemail International, Inc.*, Dec. 1985.
"A New, More Productive Way to Use the Telephone", *Voicemail International, Inc.*—(Brochure).
"While You Were Out . . . "—(Brochure).
"?For People Who Can't Afford to Miss Messages", *Voicemail International, Inc.*—(Brochure).
"Voicemail The electronic news service saves time, money and nerves", *Radio–Suisse Ltd.*, (Voicemail Agent for Europe)—(Brochure).
"Are You Being Robbed of Your Time . . . ?", *Voicemail International, Inc.*—(Brochure).
"Voicemail Instruction Manual B—85", *Televoice International*, Nov. 1980—(Manual).
"Local Telephone Numbers" (for Voicemail) and "Televoice Is As Easy As 1, 2, 3 !", *Televoice International*—(Manual).
"Voicemail Instruction Manual C—25", *Televoice International*, Jun. 1981—(Manual).
"Telephone Numbers" (for Voicemail) and "How To Use Voicemail", *Televoice International*—(Manual).
"Message Receiving/Sending" (and others), *Voicemail International, Inc.*—(Manual).
"You Can Use Voicemail To Send And Receive Messages At Anytime Anyhwere In The World", *Voicemail International, Inc.*, 1981—(Brochure).
"Advanced User Guide", *Voicemail International, Inc.*—(Manual).
"Voicemail's Basic User's Guide", *Voicemail International, Inc.*—(Manual).
"Welcome To Dowphone", *Dowphone*, Jan. 1986—(Manual).
"Telephone 1–800 Check–PDR", *Officers of Medical Economics Company, Inc.*, 1986—(Circulation/Brochure).

"Turn your telephone into an efficient electronic "mailbox"", *Western Union*, Jan. 1984,—(Brochure).
"Western Union Voice Message Service User's Guide", *Western Union*, Jul. 1984—(Brochure).
"PSA's 24 hour reservation system", *PSA*, Sep. 1986—(Brochure).
"To Better Serve Your Business, We're On Call Days, Nights and Weekends.", *Maryland Business Assistance Center*—(Brochure).
"Voice Response: Breaks Trough Call Blockage.", *Business Week*, Aug. 26, 1985—(Advertisement for Preception Technology Corporation).
"Tools for heavy hitters", *Forbes*, May 6, 1985.
"The Fidelity Automated Service Telephone", *Fidelity Group*—(Manual/Brochure).
"Stockquote Hotline", *Norwest Brokerage Services*—(Brochure).
"All You Need to Get The Stock Quotes And News You Want." *Dowphone*, 1984—(Advertisement).
"The Most Respected Name In Telemarketing", *West Interactive Corporation*—(2 Brochures).
Borison, V.S., "Transaction—telephone gets the fact at the point of sale", *Bell Laboratories Record*, Oct. 1975, pp. 377–383—(Article).
Demeautis, M., et al., "The TV 200 A Transactional Telephone", *Commutation & Transmission* n 5, 1985, pp. 71–82—(Article).
Eriksson, G., et al., "Voice and Data Workstations and Services in the ISDN", *Ericsson Review.*, May 1984, pp. 14–19—(Article).
Schrage, Michael, "A Game Von Meister in Pursuit of Profits", *Washington Post*, Sep. 23, 1985—(Article).
Svigals, J., "Low Cost Point–Of–Sale Terminal", *IBM Technical Disclosure Bulletin*, Sep. 1982, vol. 25, No. 4, p. 1835.
Turbat, A., "Telepayment And Electronic Money The Smart Card", *Commutation & Transmission* n 5, 1982, pp. 11–20—(Article).
"Voice Mail", *Sound & Communications*, Apr. 1983, vol. 28, No. 12, pp. 84–85—(Article).
Aso, Satoshi, "Trends and Applications of Voice Output Devices", *2209 J.E.E. Journal of Electronic Engineering*, Feb. 1982, vol. 19, No. 182, pp. 102–107—(Article).
Kroemer, F., "Telebox", Unterrichtsblätter, year 38/1985, No. 4, pp. 131–141 (Article)—no translation.
Kroemer, F., "Telebox", Unterrichtsblätter, year 41/1988, No. 2, pp. 67–83 (Article)—no translation.
A.S. Yatagai, "Telephonic Voice Synthesis Systems," Telecommunications, Aug. 1985, pp. 56h–I, 68.
A.J. Waite, "Getting Personal With New Technologies For Telemarketers," DM News, Feb. 15, 1987 at 50.
"Shopping via a network is no longer just talk," Data Communications, Aug. 1981 at 43.
"Growth–Oriented Systems," Restaurant Technology, Nation's Restaurant News Newspaper, Jul. 1, 1985 at 51.
C.R. Newson, "Merlin Voice Mail VM600," British Telecommunications Engineering, vol. 4, Apr. 1985, pp. 32–35.

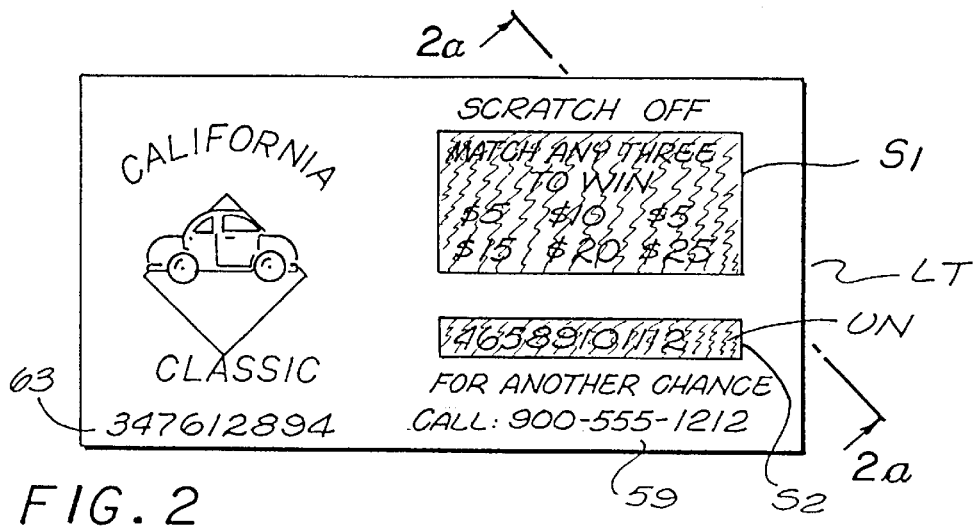
FIG. 2
FIG. 2a
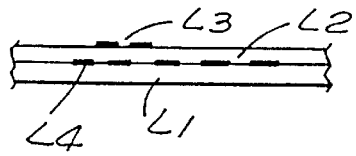
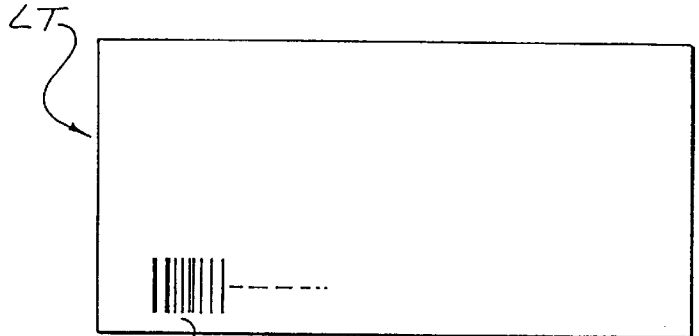
FIG. 5
FIG. 7

6,044,135

TELEPHONE-INTERFACE LOTTERY SYSTEM

This is a continuation of co-pending application Ser. No. 08/844,000, filed on Apr. 18, 1997, now U.S. Pat. No. 5,835,576, which is a divisional of Ser. No. 08/305,822, filed Sep. 13, 1994, which is a divisional of Ser. No. 07/756,956, filed Sep. 9, 1991, issued as U.S. Pat. No. 5,365,575, which is a continuation-in-part of Ser. No. 07/555,111, filed Jul. 18, 1990, issued as U.S. Pat. No. 5,048,075, which is a continuation of Ser. No. 07/342,506, filed Apr. 24, 1989, now abandoned, which is a continuation of Ser. No. 07/194,258, filed May 16, 1988, issued as U.S. Pat. No. 4,845,739, which is a continuation-in-part of Ser. No. 07/018,244, filed Feb. 24, 1987, issued as U.S. Pat. No. 4,792,968, which is a continuation-in-part of Ser. No. 06/753,299, filed Jul. 10, 1985, now abandoned.

BACKGROUND AND SUMMARY OF THE INVENTION

This is a continuation-in-part of application Ser. No. 555,111 filed Jul. 18, 1990, and entitled "Telephonic-Interface Statistical Analysis System", now U.S. Pat. No. 5,048,075, which issued Sep. 10, 1991, which was a continuation of application Ser. No. 342,506 filed Apr. 24, 1989 and entitled "Telephonic-Interface Statistical-Analysis System", now abandoned, which was a continuation of application Ser. No. 194,258 filed May 16, 1988, now U.S. Pat. No. 4,845,739, which issued Jul. 4, 1989, which was a continuation-in-part of application Ser. No. 018,244 filed Feb. 24, 1987, and entitled "Statistical Analysis System For Use With Public Communication Facility", now U.S. Pat. No. 4,792,968, which issued on Dec. 20, 1988, which was a continuation-in-part of application Ser. No. 753,299 filed Jul. 10, 1985 and entitled "Statistical Analysis System For Use With Public Communication Facility", now abandoned.

Various forms of publicly accessible communication systems for providing access to a central station have been proposed, some involving telecommunications. However, sometimes a need for ancillary functions arise in that regard, e.g. it may be desirable to positively identify a large group of persons, statistically analyze data from the group so as to accurately identify certain persons in the group and select a subset, or sub subsets of at least one person. In that regard, a need exists for an improved, effective, economical, and expedient system of telecommunication incorporating means for performing qualification, identification, analysis and selection of individual persons.

It has been proposed to interface persons at telephone calling stations directly with a computer facility. In accordance with such arrangements, recorded voice messages prompt callers to provide data by actuating the alphanumeric buttons that are conventionally employed for dialing from one telephone station to another. In one prior arrangement, a caller may actuate dialing buttons to selectively attain a communication channel or to address specific information in a computer. In another arrangement, dialing buttons may be actuated to specify an individual billing designation as for requested services. Generally, such systems are believed to have been somewhat limited in scope, often involving difficulties that are frustrating or confusing to a caller. Nevertheless, such techniques have been widely used to enhance and broaden communication.

The public lottery has become widely accepted as a basis for supporting government activities while providing aspects of entertainment and hope. Typically, conventional public lotteries have been facilitated by computers and data processing systems utilizing various formats. One conventional type of lottery incorporates the use of "scratch-off" lottery tickets that are sold by retailers. Under this system, winning tickets are returned to lottery retailers who redeem the tickets for the prize amounts, based on a physical approval of the lottery ticket.

In general, the present invention comprises a telephonic-interface lottery system and related process to further stimulate interest in the lottery by providing at least one additional chance to possibly win some prize (whether or not the scratch-off lottery ticket is a winner) by calling a pay-to-call number indicated on the scratch-off lottery ticket. The telephonic-interface lottery system can also be utilized with online tickets in which case the online terminal printer can print at least one unique identification number (either the existing printed ticket or lotto number or a new special number which may be interrelated to the existing ticket number) for subsequent telephone use. In one embodiment, scratch-off lottery tickets for use in the telephonic-interface lottery system include primary indicia defining a lottery format to evidence a winning lottery combination and at least one unique identification number used to pursue the additional chances. The lottery format and at least a portion of the identification number are concealed. The telephone number facilitating a play of the additional chance is a pay-to-call number, such as preferably a 900 phone number.

The telephonic-interface lottery system utilizes both analog (voice) and digital telephonic communication in a variety of different interface formats or programs, to record data relating to each caller, in particular data formulated by the lottery system such as the sequence number of the call including the date and time at which the call occurred, data provided by the caller such as the area code and telephone number followed by the unique identification number or additional chance number from the lottery ticket. The system is configured to eliminate duplicate entries and verify the unique identification number. Instant winners can be selected while the lottery player is on the telephone by a designated winning sequence number or by a random number generator. In addition, winners can also be selected at a later designated time by a designated winning sequence number or by the random number generator.

BRIEF DESCRIPTION OF THE DRAWINGS

In the drawings, which constitute a part of this specification, exemplary embodiments exhibiting various objectives and features hereof are set forth, specifically:

FIG. 2 is a top plan view of a scratch-off lottery ticket for use in the system of FIG. 1;

FIG. 2a is a cross sectional view taken along line 2a—2a in FIG. 2;

FIG. 5 is a bottom plan view of the scratch-off lottery ticket shown in FIG. 2;

FIG. 7 is a fragmentary diagrammatic representation of a storage cell format as may be developed in the system of FIG. 4.

DESCRIPTION OF THE ILLUSTRATIVE EMBODIMENTS

As required, detailed illustrative embodiments of the present invention are disclosed herein. However, physical communication systems, data formats, and operating structures in accordance with the present invention may be embodied in a wide variety of forms, some of which may be quite different from those of the disclosed embodiments. Consequently, the specific structural and functional details disclosed herein are merely representative; yet in that regard, they are deemed to afford the best embodiments for purposes of disclosure and to provide a basis for the claims herein which define the scope of the present invention.

Figure 1:
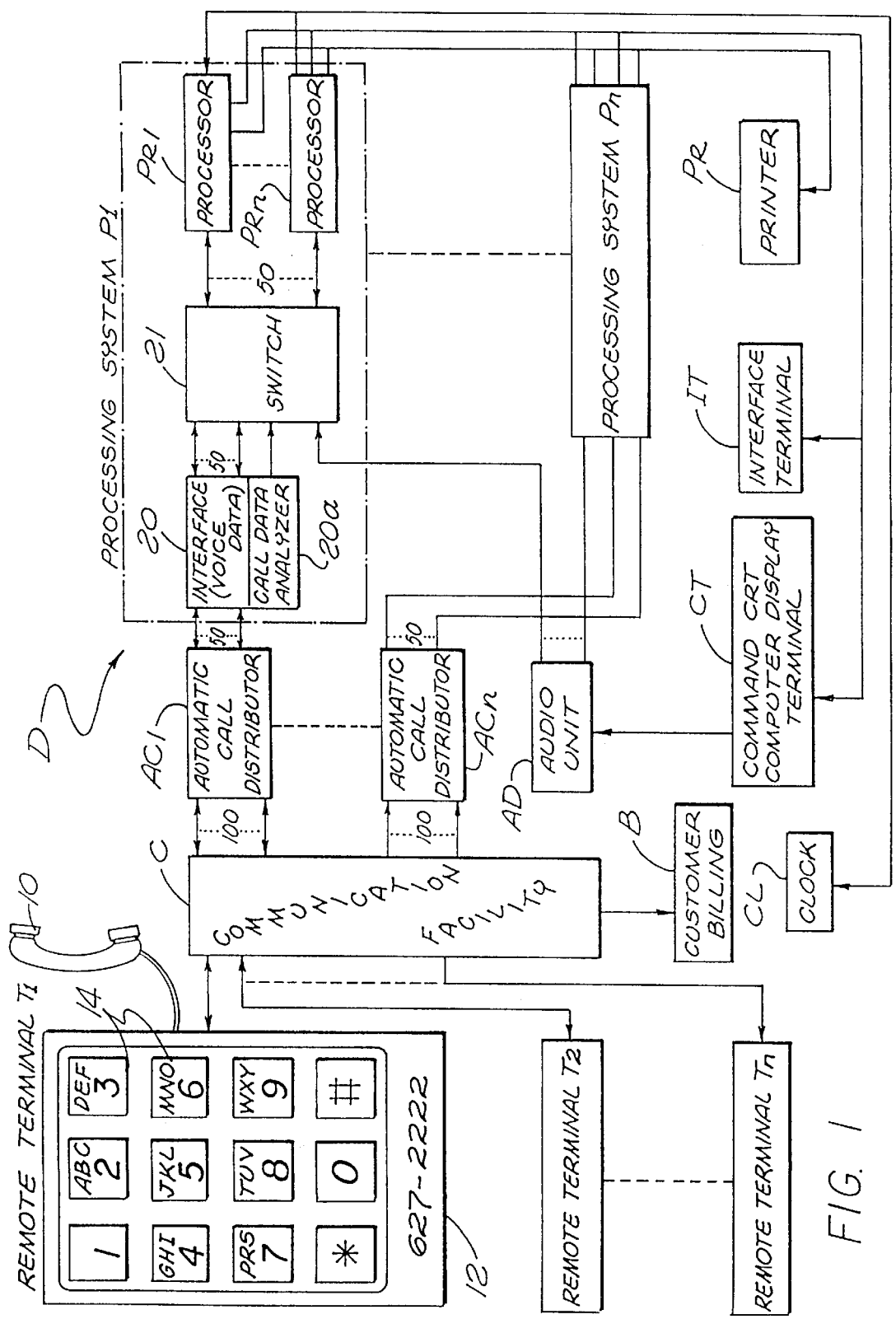
FIG. 1 is a block diagram of a telephonic-interface lottery system constructed in accordance with the present invention.

Referring initially to FIG. 1, a series of remote telephone-instrument terminals T1 through Tn are represented (left). The terminals are generally similar, and accordingly, only the terminal T1 is illustrated in detail.

In the disclosed embodiment, the remote terminals T1 through Tn represent the multitude of conventional telephone terminals that are coupled to a communication facility c which may take the form of a comprehensive public telephone system for interconnecting any associated terminals T1–Tn. In accordance with the present system, the terminals T1–Tn operate through the communication facility C to be coupled with a central station D, an embodiment of which is illustrated in some detail.

Generally in accordance with the present development, individual callers use the individual telephone stations T1 through Tn to interface the station D through the communication facility C. Callers may be screened or qualified. Also in accordance herewith, the data of individual callers including digital data provided by callers may be collected, correlated and tested in the station D for processing in accordance with various programs and external data. As a consequence, various objectives are accomplished. For example, a select subset of the callers may be isolated and specifically identified, or related data may be processed, or transactions may be actuated. The possibilities for application of the system are substantial and varied as will be apparent from the exemplary structure and functions as described in detail below.

In one operating process format, legal lotteries are enabled that are interesting, effective and very economical on an individual participant basis. -The telephonic-interface lottery system of the present invention further stimulates interest in the lottery by providing at least one additional chance to possibly win a prize in addition to a winning lottery format provided on a scratch-off lottery ticket or an online ticket. The additional chance is facilitated by calling a pay-to-call number indicated on the scratch-off lottery ticket. Some formats may use toll free 800 numbers as well.

The callers may be variously qualified on the basis of entitlement and may be identified for subsequent verification. The callers may be prompted, either through the interface or externally, to provide appropriate data, such as their age and the additional chance number which may be one or more unique identification numbers.

Considering the system of FIG. 1 in somewhat greater detail, it is to be understood that the communication facility C has multiplexing capability for individually coupling the terminals T1–Tn to the central station D on request. In the illustrative embodiment of the system, the communication facility C comprises a public telephone network and the individual terminals T1–Tn take the various forms of existing traditional or conventional telephone instruments.

The exemplary telephone terminal T1 is represented in some detail to include a hand piece 10 (microphone and earphone) and a panel 12 provided with a rectangular array of push buttons 14 in the conventional configuration. Of course, the hand piece 10 accommodates analog signals while the panel 12 is a digital apparatus. Generally in accordance herewith, the hand piece 10 serves to manifest analog signals vocally to the caller.

In accordance with conventional telephone practice, alphabetic and numeric designations are provided on the buttons 14. For example, several of the buttons 14 carry three letters along with a decimal digit. Specifically, the button designated with the numeral "2" also carries the letters "A", "B" and "C".

In that manner, the buttons 14 encompass the numerals "0–9", two symbols, and the alphabet except for the letters "Q" and "Z". Consequently, the buttons 14 accommodate the entry of decimal data, and to some extent alphabetic data.

The buttons 14 designated with symbols "*" and "#", along with the numeral "0", can be used by predetermined assignment to represent the letters "Q" and "Z" or any of a variety of other data or command components. Generally, in accordance herewith, the buttons 14 are employed to formulate digital data at the central station D in various formats determined by the instant specific use and operating format of the system.

Considering the central station D in somewhat greater detail, the communication facility C is coupled to interface a series of processing systems P1 through Pn (FIG. 1, right). Specifically, the communication facility C is connected to the processing systems P1–Pn through an associated series of automatic call distributors AC1 through ACn. Each of the automatic call distributors AC1–ACn accommodates one hundred lines from the communication facility C and accordingly, may accommodate and queue up to 100 calls.

Each of the automatic call distributors AC1–ACn may take various forms as well know in the prior art, functioning to queue incoming calls for connection to a lesser number of lines. Also, in various systems audio response units (ARU's) may be used as for preliminary processing in accordance with the operations as described below.

In the disclosed embodiment, from each of the call distributors AC1–ACn, fifty lines are connected respectively to the individual data processing systems P1–Pn through an interface 20 and a switch 21. Thus, in the disclosed embodiment, each of the automatic call distributors AC1–ACn can accommodate one hundred lines, fifty of which may be active in association with one of the processing systems P.

The processing systems P1–Pn are similar, therefore, only the processing system P1 is shown in any detail. Collectively, the processing systems P1–Pn are interconnected with a command computer terminal CT, at least one interface terminal IT, at least one printer PR and an audio unit AD. The command terminal CT is separately coupled to the audio unit AD.

As represented, the processing systems P1 through Pn each contain a number of individual function units or processors PR1 through PRn. Although various other configurations and arrangements may be employed, the explanation is facilitated by including a plurality of individual function units as treated in detail below.

Considering the processing system P1, fifty lines from the automatic call distributor AC1 are connected to the interface 20, an exemplary form of which may be a commercially available Centrum 9000 unit. The interface 20 incorporates modems, tone decoders, switching mechanisms, DNIS and ANI capability (call data analyzer 20a) along with voice interface capability. Note that the interface may actually perform analysis on data. However, to preserve the disclosed embodiment manageable, major analysis is explained with reference to processors.

Generally, DNIS capability is a function of the communication facility C (composite telephone system) to provide called terminal digital data indicating the called number. ANI capability is a similar function whereby the digital data indicates the calling number with calling terminal digital signals. Both capabilities are available for use with equipment as the interface 20 and to provide control through the call data analyzer 20a.

Accommodating up to fifty independent calls on separate communication paths to the central station D, the interface 20 is capable of providing analog (voice) signals to prompt each caller. Also accommodated are digital signals including the DNIS and ANI signals. The system contemplates the possibility of utilizing sequences of lines in rotary as well as blocking sequences of lines, the numbers for which command a particular program or operation format of a function unit as disclosed in detail below.

The interface 20 provides the connection of the fifty lines to a switch 21 which is in turn coupled to fifty function units, or processors PR1–PRn. As indicated above, multiple function units, or processors, are described in the disclosed embodiment to facilitate the explanation. of course, non-parallel techniques and multiplexed operations might well be employed as alternatives. For a similar reason, as disclosed herein, each of the processors PR1–PRn includes memory cells for each of the callers' individual data. Development and compilation of data in such cells according to various operating formats is described below. In the disclosed embodiment, the processors PR1–PRn are connected collectively to the command computer terminal CT (incorporating a CRT display), the interface terminal IT, and the printer PR. Note that the CRT display serves to visually display data regarding select subsets as explained in detail below.

Exemplary detailed structures for the processors PR1–PRn are described below; however, in general, the units may comprise a microcomputer, for example, programmed as suggested above and as disclosed in detail below to accomplish specific operating formats. As an integral part of such formats, a caller may be qualified as belonging to an entitled set of persons, such as persons holding a proper lottery ticket and being over a certain age. Also, callers may be designated both with respect to their significance and their identification. For example, callers may have different significance in a format, depending on the time or sequence of their call. Also, the designation of a caller may be exceedingly important in relation to the caller eventually being isolated as part of a subset or sub subsets, the members of whom must be accurately verified.

As described below, in a lottery format the designations may involve multiple elements which may include: random number assignments, encryption techniques, utilization of calling numbers, identification data, sequence of call and so on to facilitate reliable verification. Note that the communication facility C has a customer billing. structure B that is interfaced by the system.

On the qualification and designation of callers, the system enters a data receiving phase during which digital data (formatted at one of the telephone terminals T1–Tn by the caller) is processed by one of the processors PR1–PRn. In general, the processing evolves a subset (at least one caller) and also possibly a sub subset, the members of which may be verified and confirmed.

Either during the data accumulation phase, or after the processing phase to isolate a subset, a distinct operation may involve actuating the interface terminal T1 for direct communication between the caller and an operator at the terminal T1. Another distinct operation may involve actuation of the printer PR to provide documents in relation to the operating format, as for providing award certificates as for verifying members of an isolated subset. Also, charge slips may be generated containing at least part of the data of a particular transaction.

Figure 3:
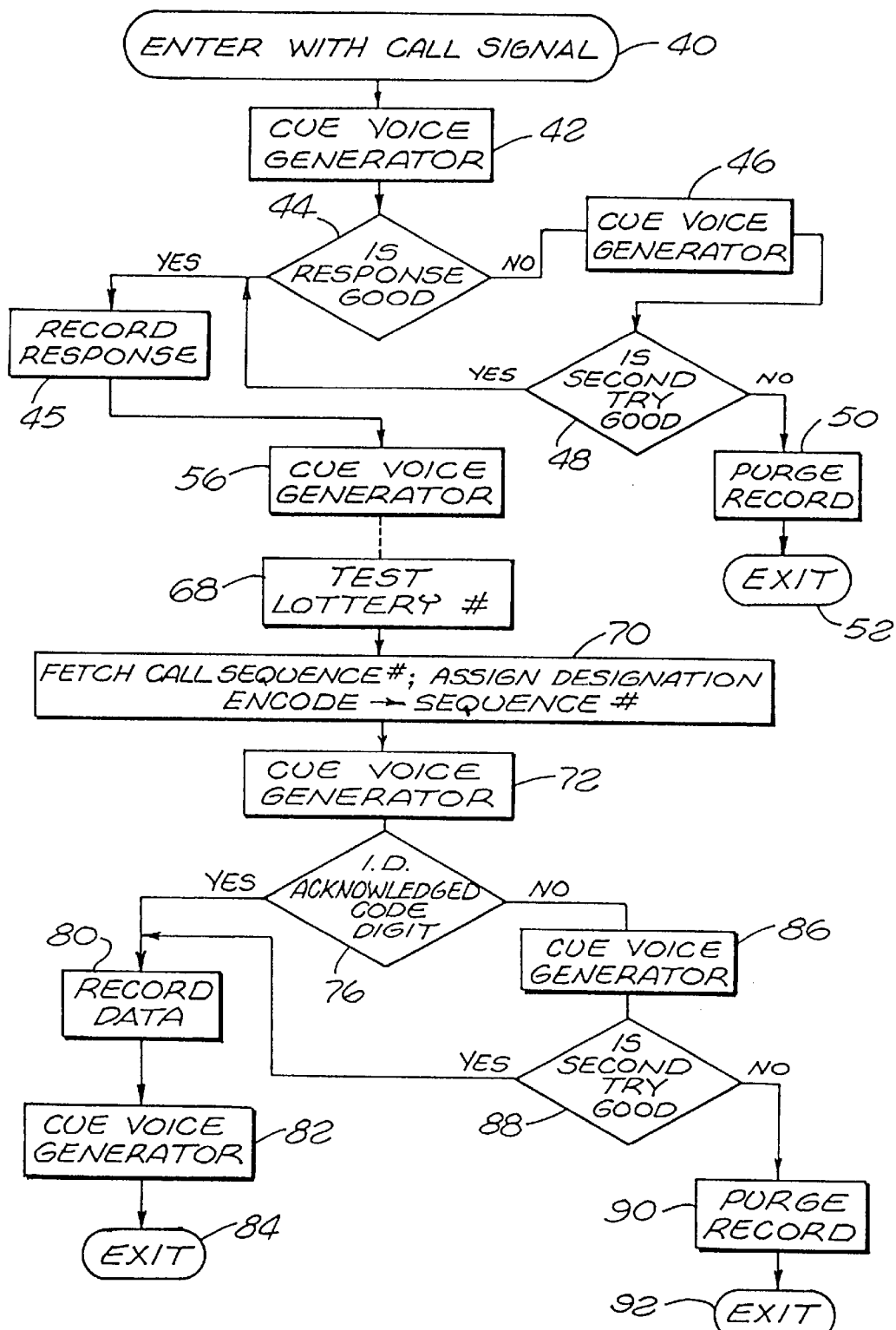
FIG. 3 is a flow diagram of one operating format of the system of FIG. 1.

A general sequence of operations for a format is represented to be initiated in FIG. 3 by the "enter" block 40 which is accordingly followed by a "cue voice generator" command block 42. If the ANI (automatic number identification) equipment is not employed, the voice generator in the interface 20 formulates speech, a representative form of which might be: "Thank you for participating in the lottery. Please give us your telephone number by actuating the call buttons on your telephone instrument."

Acting on the instructions, the caller would push the buttons 14 in sequence to indicate his telephone number, e.g. "(213) 627-2222". Alternatively, the interface 20 can accept the calling number ((213) 627-2222) according to its provision by standard ANI equipment of the communication facility C.

The resulting data signals are communicated from the interface unit 20 (FIG. 1) to the processor PR1 for testing the telephone number as valid or entitled. Essentially, the format of a proper number prompts production of a valid or "good" signal. The test is indicated by the block 44 (FIG. 3). If the response is not valid or entitled, for example contains an inappropriate number of digits or has been used to a point of excess, the operation of block 46 is initiated again cuing the voice generator 30 (FIG. 1). The voice generator accordingly instructs the caller, e.g.: "You have not entered a proper telephone number. Please reenter your telephone number by pressing the appropriate call buttons." The caller is then allotted a predetermined period of time to make a proper entry with the consequence that the system moves to a test operation as indicated by the block 48 (FIG. 3). Specifically, block 48 poses the query: "Is the second try good?"

If the caller is again unsuccessful, the system purges the record as indicated by the block 50 and the call is terminated as indicated by the block 52. In an alternative mode, the processor PR1 may abort the interface and couple the interface terminal IT for direct personal communication with the caller. The interchange would then proceed, person-to-person.

If the caller responds with a proper telephone number, the operation proceeds. Specifically, the system sequences to record the response of the proper telephone number as indicated by the block 45. That is, the caller's telephone number is recorded in an assigned specific memory cell identified with the caller. The format of the cell C1 is indicated in FIG. 7 showing the individual fields or sections. The first portion, section 53, contains a form of identification data, i.e., the caller's telephone number, i.e. "(213) 627-2222".

Note that as explained above, if the second attempt to formulate a proper number is successful, as manifest by the block 48 (FIG. 3), the response is recorded at that stage. In either case, exiting from the block 45 (FIG. 3) invokes the next operation of again queuing the voice generator as indicated by the block 56.

At this juncture, the system proceeds to receive and process the lottery ticket data as well as other data such as the identification data provided by the caller and the data formulated by the computer. The result is a subset of winners, or perhaps ultimately several subsets or sub subsets of winners or potential winners. However, first the lottery ticket number (such as the unique identification number) is entered by the caller as indicated by the block 68. The lottery number may be stored in section 66 (FIG. 7) of cell C1.

At the outset, the system may test the lottery ticket number on the basis of its format. That is the number is verifiable (as by digit combinations, for example the first two digits may equal the third) and is tested as explained above in relation to the telephone number. If a received number is invalid, the call may be terminated as explained above. Any record may be purged.

If the number is valid, it is next tested as a winner. Essentially, the number is treated as a consumable key, entitled for example to a single use for participation. The participation may include an online subset determination of winners and a subsequent offline determination of another subset of winners. These tests are indicated by the block 68. From that point, as illustrated by the block 70, data is accumulated for subsequent offline processing.

The detailed operation is not represented in FIG. 3 as it is similar to the operation illustrated by the blocks 42 through 56. However, again, a proper response is registered in the storage cell C1 as illustrated in FIG. 7 by the number "58".

During the course of the telephonic communication, the processor PR1 formulates identification data for the caller specifically such as: the date and time of the call, the chronological sequence of the call, the assigned designation of the call, and a set of acknowledgment digits for the call. Such data identification is registered in the caller's assigned cell C1 in accordance with the format of FIG. 2 being stored in sections 62, 64, 67 and 69. Note that the data may be stored in a coded interrelationship. For example, the acknowledgment digits may be related to the call record sequence. In the illustrative example, the chronological order number of the caller is 4951. The acknowledge digits may be derived from the sequence number. For example, as illustrated, a coded relationship may be established by adding "two" to each of the individual record sequence digits. Considering the example numerically:

```
       4951
       2222
       6173
```

Adding without propagated carries:

Note that the confirmation data as acknowledgement digits can be extremely important, as to communicate with an isolated member of a subset. For example, identification of an ultimate winner could be published or circulated, as by a television broadcast, then respondents checked by use of confirmation data that may be confidential.

Continuing with the above example, the call chronological sequence registered for the caller is 4951 as represented in the section 62 while the acknowledge digits are 6173 as registered in the section 66. Additionally, the processor PR1 develops an assigned designation number, e.g. designation "4951684", which is registered in the section 67, the acknowledge code or digits, e.g. 6173, being registered in the section 69. These values are formulated in accordance with conventional number techniques during the data acquisition phase. With the exemplary numerals formulated, the operation proceeds.

In the detailed operation, in addition to entering data from the remote terminal, the processor PR1 (FIG. 1) cues the internal memory as indicated by the block 70 (FIG. 3). Thus, the processor PR1 fetches the call record sequence number, assigns a designation (if not previously assigned, in some cases the sequence number is the designated number), and encodes the sequence number as the acknowledgment digits (if not previously accomplished).

To confirm receipt of the acknowledgement digits, the processor PR1 (FIG. 1) cues the voice generator in the interface 20, as indicated by the block 72 (FIG. 3) to provide information to the caller. Specifically, for example, the voice generator in the interface 20 (FIG. 1) might signal: "This transaction has been designated by the number 4951684, and is further identified by the acknowledgment digits 6173. Please make a record of these numbers as they will be repeated. Specifically, the designation number is 4951684. The acknowledgment digits are 6173. Please acknowledge this transaction by pressing your telephone buttons to indicate the acknowledge digits 6173." In lottery applications typically involving security, the order and acknowledgment of callers may be very important. Therefore, data for confirmation associated with the order is important.

The system next proceeds to the test mode as indicated by the block 76 (FIG. 3). If the caller provides the correct acknowledgment digits, the data is confirmed in the record as indicated by the block 80 and is registered in the cell C1 (FIG. 2). Additionally, the voice generator is sequenced as indicated by the block 82 (FIG. 3) to indicate the close of the communication and that the transaction is terminated as represented by the exit block 84.

In the event that a caller cannot confirm his acknowledgment digits, as indicated by the block 76, a repeat operation is performed as indicated respectively by the blocks 86 and 88. Specifically, the voice generator is queued for a second instructional message. In the event that the second attempt also fails, the data is purged and the call discounted as indicated by block 90 and an exit block 92. If the second try is successful (test block 88), as indicated by the block 80, the record is perfected as indicated above.

As a result of the likelihood of a large number of calls, as described above, data cells in the processors PR1–PRn (FIG. 1) are developed with specific information relating to each call. Such data, accumulated from the various calls may be considered by logic comparisons in the computer 22 to select the subset of winning persons who should be isolated at a later point.

The processing operation usually involves comparison testing which compares caller data from individual memory cells of the processors P1–Pn (FIG. 1) with test data, such as a look-up table, that is supplied through the command terminal CT.

Figure 4:
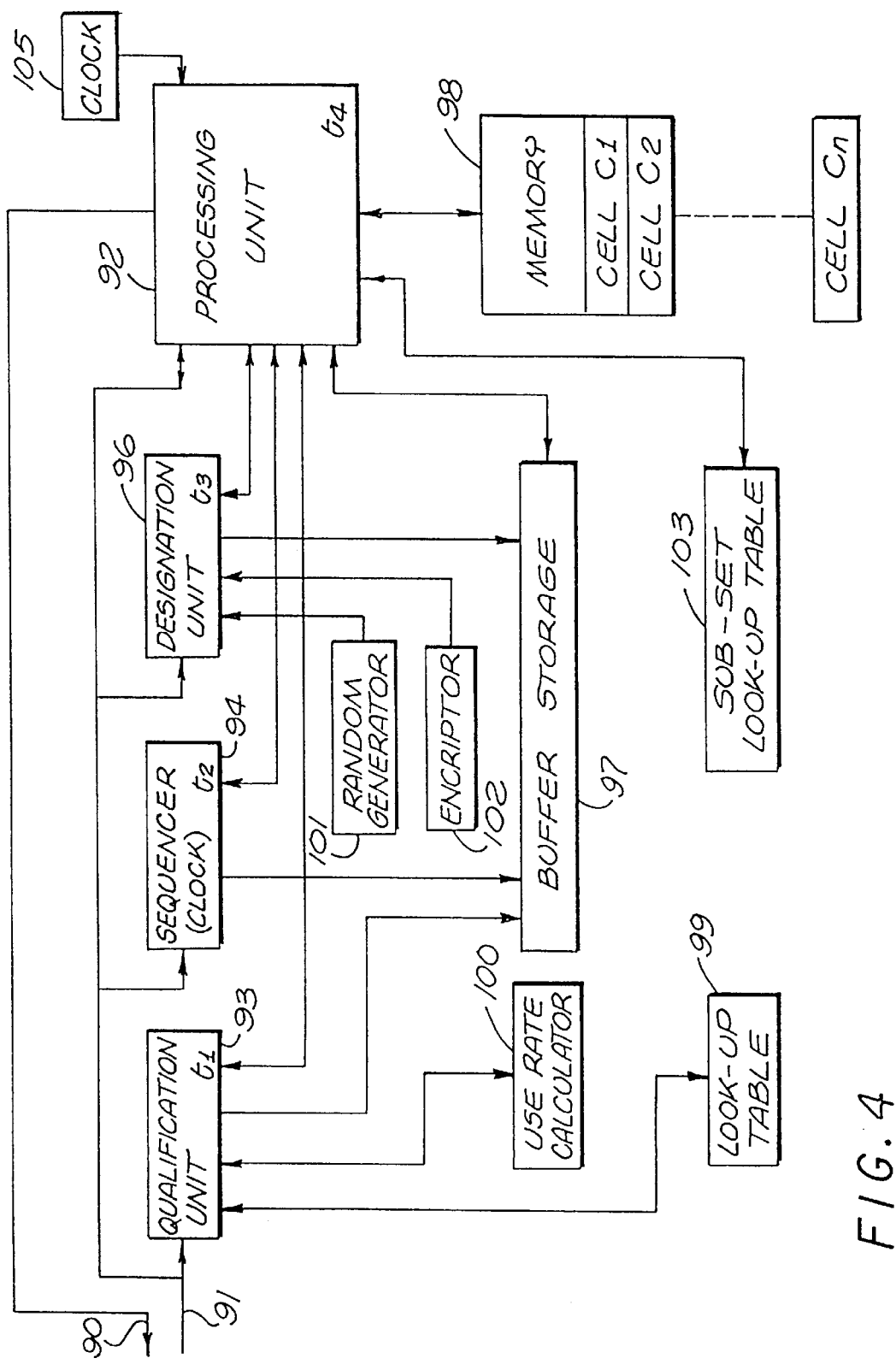
FIG. 4 is a block diagram of a form of processor or function unit as may be employed in the system of FIG. 1.

Preliminary to considering an exemplary form of the telephonic-interface lottery system of the present invention, reference will now be made to FIG. 4 showing an exemplary structural form for the processors PR1–PRn. From the switch 21 (FIG. 1) a pair of communication lines 90 and 91 are indicated in FIG. 4 (top left). The line 90 provides signals from a processing unit 92 while the line 91 provides signals to the processing unit 92 along with other components as represented in FIG. 4. The separate lines 90 and 92 facilitate explanation.

The processing unit 92 may take the form of a minicomputer programmed to accommodate the functions of various applications, as disclosed in detail below. As indicated above, the system may utilize a plurality of independent function units or processing units, e.g., processing unit 92, operating in a somewhat parallel configuration, or alternatively, a limited number of processors may be driven sequentially to accommodate the functional operations as described.

The input line 91 (upper left) is connected specifically to a qualification unit 93, a sequencer 94 and a designation unit 96, as well as the processing unit 92 as indicated above. The qualification unit qualifies access from a remote terminal T1–Tn to the processing unit 92 as described in detail below. In accordance with various applications or operating formats, the qualification unit 93, the sequencer 94 and the designation unit 96 operate preliminarily with respect to individual callers. Generally, these units qualify or test callers for entitlement to participate in the lottery, develop a sequence-of-calls record and provide forms of designations for callers that may be authenticated. As described in detail below, the units function in sequence to accomplish such operations and accordingly are each individually connected to the processing unit 92 and a buffer storage 97. Essentially, the buffer storage 97 is illustrated separately from the processing unit 92 along with the unit 93, sequencer 94, unit 96, and so on, again in order to facilitate the explanation. Similarly illustrated are a memory 98 (with cells C1–Cn), a look-up table 103 and a clock 105.

Considering the processor of FIG. 4 in further detail, the qualification unit 93 (upper left) is connected to a look-up table 99 and a use-rate calculator 100. The designation unit 96 (top center) is connected to a random number generator 101 and an encryptor 102.

In view of the above structural description of the system, consideration will now be given to a certain specific application in relation to the operation of the system.

As the illustrative operating format, an embodiment of the telephonic-interface lottery system will now be described. The legalized state lottery typically features various "scratch-off" ticket lottery game formats such as "the California Classic", "Treasure Hunt", "Blackjack", "Lucky 7's" and the like. In addition, lotteries typically offer online games such as Lotto. The enhanced lottery system accommodated by the present telephone system may utilize pay-to-dial numbers ("900-xxxx") or toll free 800 numbers and may be restricted to a limited number of uses for defined intervals of time. For example, a person might be entitled to play the lottery only a limited number of times or to the extent of a limited dollar value during a predetermined interval.

Certain digits of the unique identification number may contain information on a particular format, for example the "California Classic". Multiple formats may run simultaneously and the DNIS for example may indicate the lottery format and processing for each game. Additionally digits in the unique number when entered by the caller might indicate a telephone subformat.

Referring now to FIG. 2, a lottery participant upon purchasing a "scratch-off" lottery ticket LT for use in the system D has at least two chances to win. The first chance is facilitated by a lottery format defining a winning combination, for example by matching three like dollar amounts or symbols from a plurality provided in a first section S1. Subsequent chances are provided by telephone communication in accordance herewith. Preliminarily, consider the specific structure of a ticket in accordance herewith.

The lottery ticket LT is made from any suitable base substrate typically used and is likewise suitably sized to accommodate all the information. A scratch-off layer covers part or all of the ticket. Structurally, the ticket LT is a composite including a base substrate L1 (FIG. 2a) bearing a latex scratch-off layer L2. Visible print or indicia L3 appears on the latex layer L2 which may be integral or over stamped. Concealed indicia L4 is fixed on the substrate L1 and is revealed when the latex layer is removed. As illustrated in FIG. 2, the concealing areas S1 and S2 of the latex layer L2 are illustrated by wavy lines, accordingly normally concealed indicia is revealed.

As illustrated in FIG. 2, the upper section S1 of the scratch-off latex layer L2 defines ticket-specified winners. That is, as indicated above, matching combinations or symbols define winners. The lower scratch-off section S2 of the ticket LT indicates a unique identification number UN which may be several digits. The first section S1 and at least a portion of the identification number UN is covered with a suitable substance, such as latex in order to conceal the lottery format and the complete identification number from the lottery participants, retailers and the like and prevent any fraudulent activity. The unique identification number may also be the stock number (sequence number assigned by the lottery for each ticket to keep track thereof) of the lottery ticket with additional concealed or latex protected digits.

The lottery ticket LT also indicates the pay-to-dial telephone number indicia 59 to facilitate additional chances to win. For example, the lottery ticket LT bears indicia 61 indicating "For Another Chance call 900-555-1212". Accordingly, regardless of whether the lottery ticket LT defines a winning combination, the lottery participant has another chance to possibly win by dialing the pay-to-dial number and incurring a further minimal cost, for example 50 cents. In some formats all players including winners of the matching combinations are provided with an additional opportunity to win. Note that the ticket LT also carries another number as indicated by the unconcealed indicia 63.

The lottery ticket LT on its reverse side is provided with a bar code BC defining a number corresponding to the unique identification number UN which would allow the retailer or the lottery system to verify instant winners when the lottery tickets are redeemed and automatically cancel related information on the data stored in the memory.

Pursuing the operation of the system in greater detail, using the specified calling number (900 555 1212) from the terminal T1 (FIG. 1) the caller would actuate the push buttons 14 to establish contact with the processing system P1. Communication would be through the communication facility C, the automatic call distributor AC1, the interface 20 and the switch 21 as described in detail above.

The initial operation involves qualification of the caller to participate in the lottery. Again, ANI or caller interface techniques may be employed as described above. If the caller is involved, the interface 20 is actuated by the qualification unit 93 during the operating interval t1 to instruct the caller: "Please key in your telephone calling number". As indicated above, an alternative involves the system simply registering the calling number on the basis of its provision by ANI equipment. As indicated above, in one sequence the callers telephone number is tested at this point. Also, the lottery number also may be tested at this stage or subsequently. Various sequences are practical, another of which involves data accumulation prior to winner tests.

After the caller's telephone number is registered, the instruction is given: "Participation in the lottery is for persons over twenty-one years of age. Accordingly, please key in the year of your birth". A birth date, social security number, driver's license or credit card number may be similarly registered to confirm age or confirm identification of caller. Alternatively, the combination of telephone number and date or year of birth or age could be used. In any event, the caller's data is registered and the qualification unit 93 then functions to test the data as provided. Specifically, the caller's telephone number is checked in a look-up table 99 to determine whether or not it is a proper and currently valid number for use in the lottery.

If the data indicates a qualified caller, the system proceeds to the next phase of designating the transaction. The designation unit 96 operates during the interval t3 to provide the caller with a designation for the current transaction which may be the sequence number. As explained above, the random generator 101 with or without the encryptor 102 may be employed to create an identification number which may include an encrypted form of the caller's telephone number. Accordingly, data for the transaction is established in the buffer 97 then set in a cell of the memory 98 (FIG. 4). Specifically, the completed data cell format might be as follows: Telephone No.—Birth Year—Designation—Random No.

In the format being described, the system next functions to generate the random number as indicated above which will then be tested against a series of other numbers to determine whether or not the caller is a winner. In that regard, elements in the processing unit 92 which accomplish the operation are illustrated in FIG. 6 which will now be considered in detail.

Typically, a caller will have scratched off the latex layer L2 over the section S2 prior to placing a call to the lottery interface system. Depending on the operating sequence employed, at some point, the caller is cued to input the number carried by the indicia UN. Specifically, the number is simply entered using the terminal touch tone keypad. As a result winners can be selected with online processing while the caller is on the phone as well as by off-line processing at a later designated time. Both online and off-line winners can be selected by determining a winning sequence number or by selecting a random lottery number or selecting a random sequence number.

A random number generator 160 functions on command to provide a three-digit number. With the consummation of a call, the random number generator 160 is actuated to provide the caller's random number in a selected caller cell 162. From that location, the caller's random number is compared with numbers from a register 164 by a comparator 166. The numbers in the register 164 were previously passed through a gate 174 from the generator 160. In the event of coincidence, the comparator provides an output "yes" signal to a line 168. Conversely, the failure of coincidence prompts the comparator 166 to provide a "no" output to a line 170. Essentially, a "yes" indicates a win while a "no" indicates the caller has lost.

Figure 6:
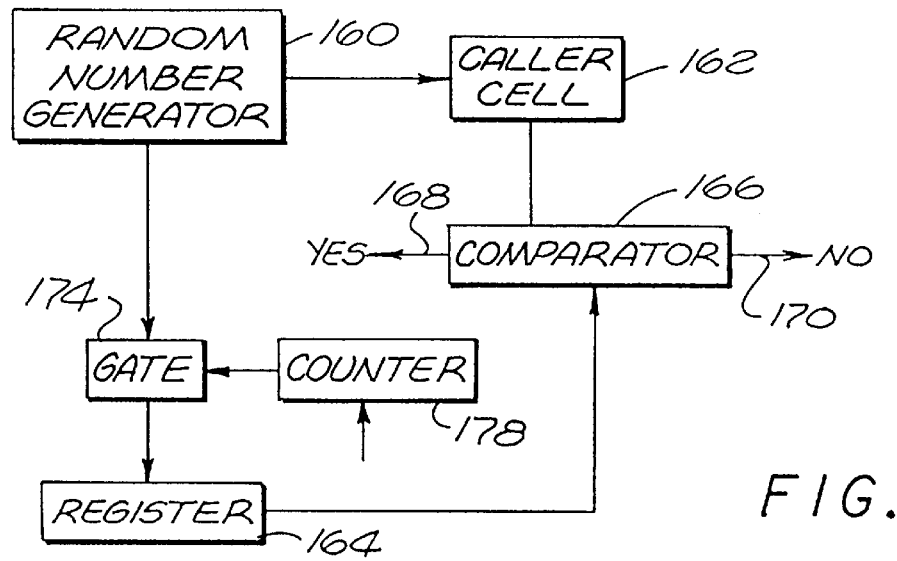
FIG. 6 is a block diagram of elements in an operating function unit of FIG. 4.
Figure 8:
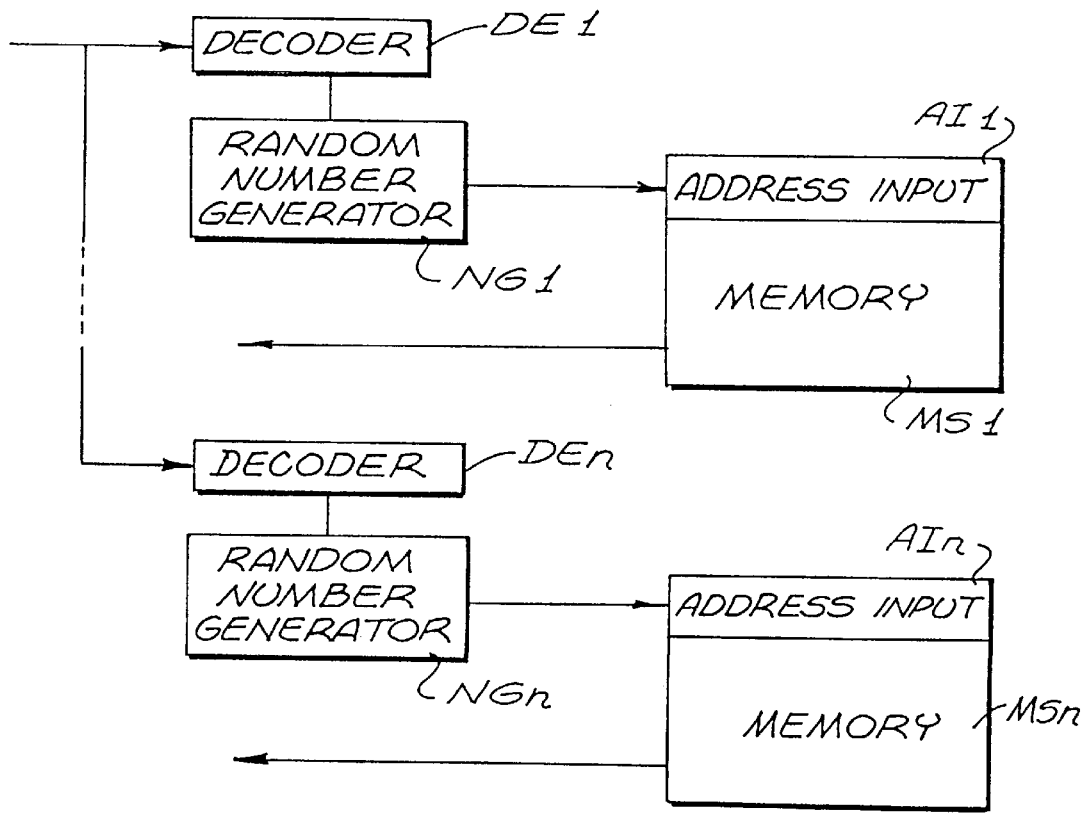
FIG. 8 is a block diagram of elements in an operating function unit of FIG. 4.

The elements of FIG. 6 provide a random operating format to determine winners on a somewhat statistical basis; however, the system increases the probability with the passage of time when no win occurs. In that regard, at the outset of an operating cycle, the random number generator 160 provides a random number that is passed through the gate 174 to the register 164. In the exemplary format, a three-digit number would be provided. At that stage, the caller's random number, from the cell 162, would be compared with the single number in the register 164 by the comparator 166. However, with the passage of time, calls are tallied or time is metered by a counter 178. Accordingly, upon the attainment of a predetermined count, the gate 174 is again qualified to enter another number in the register 164. Accordingly, an increasing set of numbers are held in the register 164 for comparison with each caller's number. Of course, the more numbers in the register 164, the higher probability of a caller winning and that relationship depends upon the duration or number of calls since the last winner.

Either a win or a loss as indicated within the processing unit 92 (FIG. 4) prompts the interface 20 to respond appropriately to the caller announcing his results. If there is a win, the designation may be reinforced and additional identification may be taken as explained above. Of course, if the prize simply involves a credit on the callerts telephone bill or his credit account, identification and designation become less critical considerations.

In the event of awards to be claimed, the processing system P1 (FIG. 1) may actuate the printer PR to produce a positive identification of the winner, which document may be redeemed only by the caller providing the assigned designation along with confirmation of his identification data.

Generally in relation to awards, the processing unit 92 may also utilize a random number format for determining the significance of awards. That is, a random number may be actuated to provide numerals from one through twenty, for example, the magnitude of the number generated for a caller indicating the significance of his award. Normally such information would be provided to the caller and registered in his memory cell.

With respect to memory cells generally, it is to be noted that actuated memory cells may be cleared for callers who are not winners. Accordingly, a limited number of memory cells store the subset of winners for subsequent confirmation processing and so on. Alternatively, historical data cells for each caller may be maintained.

As explained above, clearances may be perfected through the look-up table 99 (FIG. 4) in association with the qualification unit 93 or approvals through a consumable key step may be extended to incorporate functions of the processing unit 92 in association with the memory 98. For example, if qualification simply involves a check-off operation, the look-up table 99 will normally be employed.

As explained above, the arrangement of the function unit (or units) may be variously embodied in a single processor or many processors, depending on various considerations as time sharing, multiplexing, paralleling and so on. The systems as described above embody the components bulked together in one location. However, components of the system could be spaced apart geographically, using dedicated lines or polling techniques. An illustrative embodiment is shown in FIG. 9.

Call distributors CD1–CDn are located at different geographic locations along with associated interface units IA1–IAn and IB1–IBn. Each of the interface units, as unit IA1 is coupled to an interface central processing unit 260 as indicated by lines 252, 254, 256 and 258. The interface CPU 260 may be located geographically proximate the interface units ,for example in Omaha, to record and store the data relating to each caller, including the data provided by the caller and the data formulated by the computer in a data file 264 coupled thereto as indicated at line 266. Each of the lines may take the form of a dedicated telephone line or a polling telephonic coupling. The interface central processing unit 260 is coupled to a lottery central. processing unit 251 indicated at line 262 which may be located remote from the interface central processing unit 260 as for example in Indianapolis.

Figure 9:
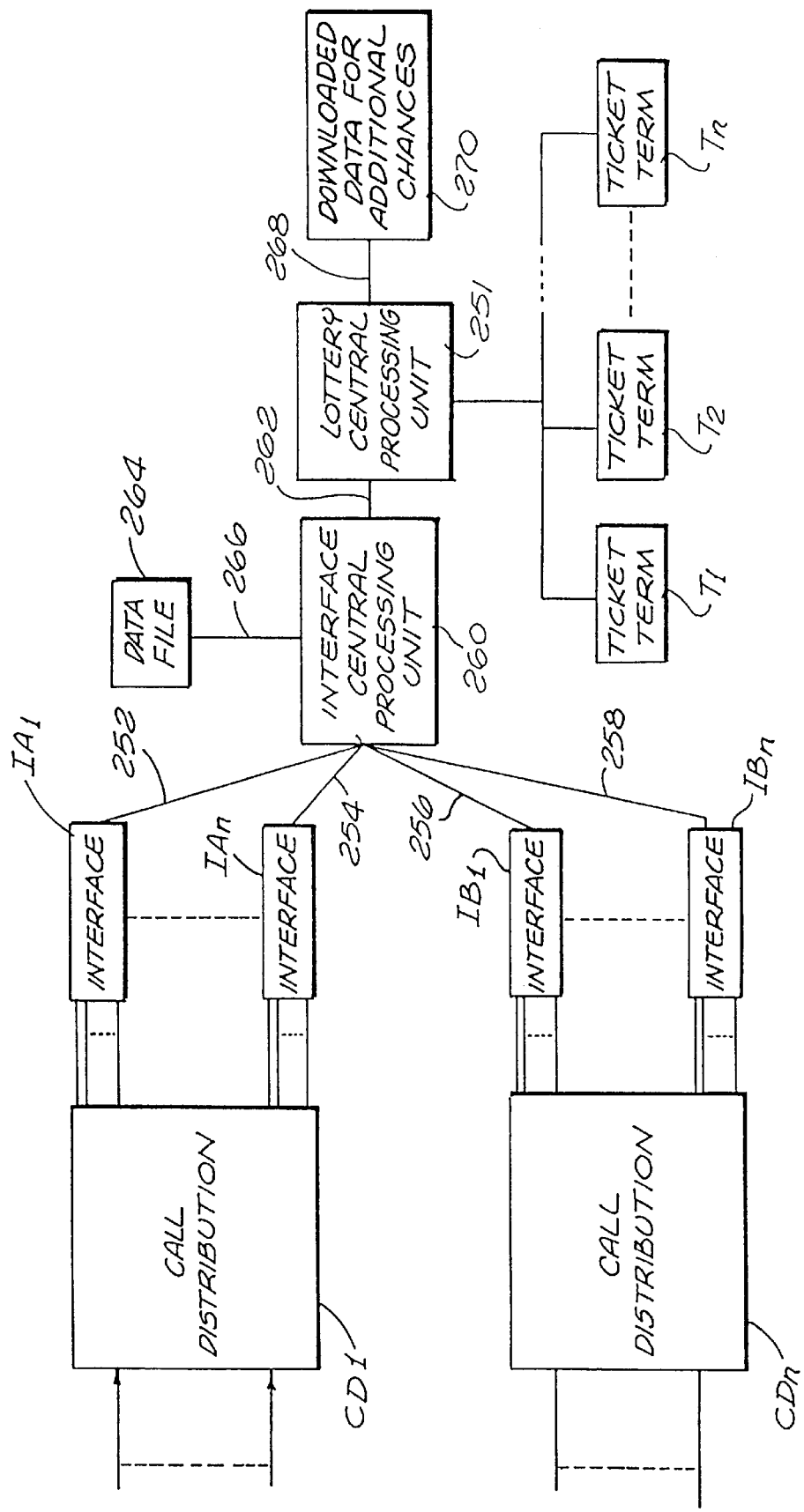
FIG. 9 is a block diagram of the connections between an interface CPU, a remote lottery CPU and remote stations.

In the operation of the system of FIG. 9, the call distributors CD are coupled to a telephonic communication system and accordingly allow the interface units I and the interface CPU 260 to provide interface communication between the lottery central processing unit 251 and a multitude of remote terminals T1–Tn. The interface central processing unit 260 stores complete data with regard to each caller in the data file 264. The interface central processing unit 260 may variously transmit or download important data only, for example the unique identification or ticket number and prize type (such as B) or prize amount ($50) stored in section 65 (FIG. 7) to the lottery central processing unit 251. Accumulated data with regard to a plurality of callers may be transmitted at a designated time to save on transmission time and cost. Downloaded data for the additional chances is also stored at a file 270. Thus, the distributed-component system is capable of executing the various formats as explained above with reference to the illustrative structure.

In view of the above explanation of exemplary systems, it will be appreciated that other embodiments of the present invention may be employed in many applications to accumulate statistical data, process such data, and define subsets of callers of concern. While certain exemplary operations have been stated herein, and certain detailed structures have been disclosed, the appropriate scope hereof is deemed to be in accordance with the claims as set forth below.

What is claimed is:

1. A ticket and ticket processor for use in combination with a touch tone telephone instrument of a telephone communication facility for routine calls, whereby indications on said ticket are processed in accordance with one specific format of a plurality of formats, said ticket comprising:

a base substrate sized to accommodate specific indicia related to the use of the ticket;

visual format indicia on said base substrate visibly indicating said one specific format of a plurality of formats to be simultaneously processed by said telephonic-interface control system;

telephone number indicia on said base substrate for entry by touchtone telephone to provide signals indicative of called terminal digital data for identifing a called number for processing in accordance with said one specific format;

identification indicia on said base substrate indicating a unique identification number, said unique identification number containing information on said one specific format and for entry by said touchtone telephone instrument to provide signals indicative of said unique identification number for processing in accordance with said one specific format, and further for providing an indication that said unique identification number has reached a predetermined limit on use;

additional indicia on said base substrate, said additional indicia being machine readable and co-related to said unique identification number; and said ticket processor comprising:

a processor for processing tickets in accordance with said plurality of formats including said one specific format and further to limit processing under control of said signals indicative of said unique identification number; and an interface unit to receive said signals indicative of called terminal digital data (DNIS) for controlling said processor to process in accordance with said one specific format.

2. A ticket and ticket processor according to claim 1 further including a concealing layer disposed on said base substrate for obscuring at least a portion of said unique identification number and removable to reveal said unique identification number.

3. A ticket and ticket processor according to claim 1, wherein said predetermined limit on use relates to a limited dollar value.

4. A ticket and ticket processor according to claim 3, wherein said predetermined limit on use is further limited to use for a defined interval of time.

5. A ticket and ticket processor according to claim 1, wherein said ticket processor is adapted to receive calling number identification signals and utilizes at least certain of said calling number identification signals to control at least certain operations of said one specific format.

6. A ticket and ticket processor according to claim 1, wherein said predetermined limit on use relates to a limited dollar value and to limited use for a defined interval of time, and further wherein said ticket processor is adapted to receive calling number identification signals and utilizes at least certain of said calling number identification signals to control at least certain operations of said one specific format.

7. A ticket and ticket processor according to claim 6, further including a concealing layer disposed on said base substrate for obscuring at least a portion of said unique identification number and removable to reveal said unique identification number.

8. A ticket and ticket processor according to claim 1, wherein said unique identification number includes a stock number for tracking said ticket.

9. A ticket and ticket processor according to claim 1, wherein said telephone number indicia indicates a toll free number associated with said specific format for calling to attain processing of said unique identification number in accordance with said specific format.

10. A ticket and ticket processor according to claim 1, further including a second additional indicia, wherein at least one of said additional indicia and second additional indicia is a numerical indicia.

11. A ticket and ticket processor according to claim 1, further including at least two additional indicia on said base substrate, at least one of said additional indicia being machine readable and being co-related to said unique identification number.

12. A ticket and ticket processor for use in combination with a touch tone telephone instrument of a telephone communication facility for routing calls, whereby indications on said ticket are processed in accordance with one specific format of a plurality of formats, said ticket comprising:

a base substrate sized to accommodate specific indicia related to the use of the ticket;

visual format indicia on said base substrate visibly indicating said one specific format of a plurality of formats to be simultaneously processed by said telephonic-interface control system;

telephone number indicia on said base substrate for entry by touchtone telephone to provide signals indicative of called terminal digital data for identifying a called number for processing in accordance with said one specific format; and identification indicia on said base substrate indicating a unique identification number, said unique identification number containing information on said one specific format and for entry by said touchtone telephone instrument to provide signals indicative of said unique identification number for processing in accordance with said one specific format, and further for providing an indication that said unique identification number has reached a predetermined limit on use, the predetermined limit on use including a limited dollar value for use for a predetermined interval of time; and said ticket processor comprising:

a processor for processing tickets in accordance with said plurality of formats including said one specific format and further to limit processing under control of said signals indicative of said unique identification number; and an interface unit to receive said signals indicative of called terminal digital data (DNIS) for controlling said processor to process in accordance with said one specific format.

13. A ticket and ticket processor according to claim 12, further including a concealing layer disposed on said base substrate for obscuring at least a portion of said unique identification number and removable to reveal said unique identification number.

14. A ticket and ticket processor according to claim 12, wherein said ticket processor is adapted to receive calling number identification signals and utilizes at least certain of said calling number identification signals to control at least certain operations of said one specific format.

15. A ticket and ticket processor according to claim 12, further including an additional indicia on said base substrate, said additional indicia being co-related to said unique identification number.

16. A ticket and ticket processor according to claim 15, further including a second additional indicia, wherein at least one of said additional indicia and second additional indicia is a numerical indicia.

17. A ticket and ticket processor according to claim 12, further including at least two additional indicia on said base substrate, at least one of said additional indicia being machine readable and being co-related to said unique identification number.

18. A ticket and ticket processor according to claim 17, wherein at least one of said additional indicia is numeric indicia.

19. A ticket and ticket processor according to claim 12, wherein said one specific format qualifies a caller as belonging to an entitled set of persons.

20. A ticket and ticket processor for use in combination with a touch tone telephone instrument of a telephone communication facility for routing calls, whereby indications on said ticket are processed in accordance with one specific format of a plurality of formats, said ticket comprising:

a base substrate sized to accommodate specific indicia related to the use of the ticket;

visual format indicia on said base substrate visibly indicating said one specific format of a plurality of formats to be simultaneously processed by said telephonic-interface control system;

telephone number indicia on said base substrate for entry by touchtone telephone to provide signals indicative of called terminal digital data for identifying a called number for processing in accordance with said one specific format;

identification indicia on said base substrate indicating a unique identification number, said unique identification number containing information on said one specific format and for entry by said touchtone telephone instrument to provide signals indicative of said unique identification number for processing in accordance with said one specific format, and further for providing an indication that said unique identification number has reached a predetermined limit on use; and at least two additional numerical indicia on said base substrate, at least one of said additional indicia being machine readable and being co-related to said unique identification number; and said ticket processor comprising:

a processor for processing tickets in accordance with said plurality of formats including said one specific format and further to limit processing under control of said signals indicative of said unique identification number; and an interface unit to receive said signals indicative of called terminal digital data (DNIS) for controlling said process in accordance with said one specific format.

21. A ticket and ticket processor according to claim 20 further including a concealing layer disposed on said base substrate for obscuring at least a portion of said unique identification number and removable to reveal said unique identification number.

22. A ticket and ticket processor according to claim 20, wherein said predetermined limit on use relates to a limited dollar value.

23. A ticket and ticket processor according to claim 20, wherein said predetermined limit on use is further limited to use for a defined interval of time.

24. A ticket and ticket processor according to claim 20, wherein said ticket processor is adapted to receive calling number identification signals and utilizes at least certain of said calling number identification signals to control at least certain operations of said one specific format.

\* \* \* \* \*